(12) United States Patent
Gaensbauer et al.

(10) Patent No.: US 10,837,090 B2
(45) Date of Patent: Nov. 17, 2020

(54) MAGNETIC LEVITATION HEATING OF METAL WITH CONTROLLED SURFACE QUALITY

(71) Applicant: Novelis Inc., Atlanta, GA (US)

(72) Inventors: David Anthony Gaensbauer, Atlanta, GA (US); David Edward Gantzer, Woodstock, GA (US); Robert Bruce Wagstaff, Greenacres, WA (US); Theresa Elizabeth MacFarlane, Woodstock, GA (US); Rodger Brown, Atlanta, GA (US); Andrew James Hobbis, Kennesaw, GA (US); Antoine Jean Willy Pralong, Granges (CH)

(73) Assignee: NOVELIS INC., Atlanta, GA (US)

( * ) Notice: Subject to any disclaimer, the term of this patent is extended or adjusted under 35 U.S.C. 154(b) by 92 days.

(21) Appl. No.: 15/716,692

(22) Filed: Sep. 27, 2017

(65) Prior Publication Data

US 2018/0092164 A1    Mar. 29, 2018

Related U.S. Application Data

(60) Provisional application No. 62/400,426, filed on Sep. 27, 2016, provisional application No. 62/505,948, filed on May 14, 2017.

(51) Int. Cl.
*H05B 6/32*      (2006.01)
*F27D 99/00*     (2010.01)
(Continued)

(52) U.S. Cl.
CPC .............. *C22F 1/04* (2013.01); *B21B 39/02* (2013.01); *B21B 39/34* (2013.01); *B21C 47/16* (2013.01);
(Continued)

(58) Field of Classification Search
CPC ......... B21B 39/02; B21B 39/34; B21C 37/02; B21C 47/16; B21C 47/18; B21C 47/3433;
(Continued)

(56) References Cited

U.S. PATENT DOCUMENTS 1,872,045 A    8/1932  Smitmans
2,001,637 A    5/1935  Talbot
(Continued)

FOREIGN PATENT DOCUMENTS

CN      1190361 A      8/1998
CN    101795785 A      8/2010
(Continued)

OTHER PUBLICATIONS

International Patent Application No. PCT/US2017/053676, International Search Report and Written Opinion dated Dec. 21, 2017, 13 pages.

(Continued)

*Primary Examiner* — Scott R Kastler
*Assistant Examiner* — Michael Aboagye
(74) *Attorney, Agent, or Firm* — Kilpatrick Townsend & Stockton LLP

(57) ABSTRACT

A non-contact heating apparatus uses a series of rotating magnets to heat, levitate, and/or move metal articles therethrough. A first series of rotating magnets heats the metal article to a desired temperature. A second series of rotating magnets levitates the metal article within the heating apparatus and maintains desired tension in the metal article, including urging the metal article through the heating apparatus. The heating apparatus can extend sufficiently far to soak the metal article at the desired temperature for a desired duration. The rotating magnets can be positioned outside of an electrically non-conductive, heat resistant chamber filled (Continued)

with an inert or mildly reactive gas, through which the metal article passes in the heating apparatus.

21 Claims, 10 Drawing Sheets

(51) Int. Cl.

| | |
|---|---|
| H05B 6/36 | (2006.01) |
| C22F 1/04 | (2006.01) |
| B21C 47/18 | (2006.01) |
| B21C 47/34 | (2006.01) |
| H05B 6/10 | (2006.01) |
| B21C 47/16 | (2006.01) |
| B65H 29/00 | (2006.01) |
| B65H 29/20 | (2006.01) |
| B21D 22/02 | (2006.01) |
| B21D 37/16 | (2006.01) |
| C21D 1/42 | (2006.01) |
| B21B 39/02 | (2006.01) |
| B21B 39/34 | (2006.01) |
| B21C 37/02 | (2006.01) |
| C21D 1/04 | (2006.01) |
| C22C 21/02 | (2006.01) |
| C22C 21/06 | (2006.01) |
| C22C 21/10 | (2006.01) |
| C22C 21/12 | (2006.01) |
| B65G 54/02 | (2006.01) |
| C22F 1/02 | (2006.01) |
| H02N 15/00 | (2006.01) |
| F27D 19/00 | (2006.01) |

(52) U.S. Cl.
CPC .......... *B21C 47/18* (2013.01); *B21C 47/3433* (2013.01); *B21C 47/3483* (2013.01); *B21D 22/022* (2013.01); *B21D 37/16* (2013.01); *B65H 29/006* (2013.01); *B65H 29/20* (2013.01); *C21D 1/42* (2013.01); *F27D 99/0001* (2013.01); *H05B 6/104* (2013.01); *H05B 6/32* (2013.01); *H05B 6/36* (2013.01); *B21C 37/02* (2013.01); *B65G 54/02* (2013.01); *C21D 1/04* (2013.01); *C22C 21/02* (2013.01); *C22C 21/06* (2013.01); *C22C 21/10* (2013.01); *C22C 21/12* (2013.01); *C22F 1/02* (2013.01); *F27D 2019/0003* (2013.01); *H02N 15/00* (2013.01); *Y02P 10/25* (2015.11)

(58) Field of Classification Search
CPC .. B21C 47/3483; B21D 22/022; B21D 37/16; B65H 29/006; B65H 29/20; C21D 1/42; F27D 99/0001; H05B 6/104; H05B 6/32; H05B 6/36; C22F 1/04
USPC .......... 266/87, 249, 250, 252; 148/516, 287, 148/307, 527, 529; 432/128, 152
See application file for complete search history.

(56) References Cited

U.S. PATENT DOCUMENTS

| | | | |
|---|---|---|---|
| 2,041,235 A | 5/1936 | Darbaker | |
| 2,058,447 A | 10/1936 | Hazelett | |
| 2,058,448 A | 10/1936 | Hazelett | |
| RE21,260 E | 11/1939 | Hazelett | |
| 2,334,109 A | 11/1943 | McBain et al. | |
| 2,448,009 A | 8/1948 | Baker | |
| 2,448,012 A | 8/1948 | Baker | |
| 2,481,172 A | 9/1949 | Staggs | |
| 2,527,237 A | 10/1950 | Wilcox, Jr. | |
| 2,566,274 A | 8/1951 | White et al. | |
| 2,722,589 A | 11/1955 | Marquardt | |
| 2,731,212 A | 1/1956 | Baker | |
| 2,753,474 A | 7/1956 | Walworth et al. | |
| 2,769,932 A | 11/1956 | Zozulin et al. | |
| 2,895,034 A | 7/1959 | Baffrey et al. | |
| 2,912,552 A | 11/1959 | Baermann | |
| 3,008,026 A | 11/1961 | Kennedy | |
| 3,272,956 A * | 9/1966 | Baermann | C21D 1/42 |
| | | | 219/645 |
| 3,376,120 A | 4/1968 | Hiegel | |
| 3,438,231 A | 4/1969 | Petzschke | |
| 3,444,346 A | 5/1969 | Russell et al. | |
| 3,453,847 A | 7/1969 | Romanauskas | |
| 3,535,902 A | 10/1970 | Sevenich et al. | |
| 3,562,470 A * | 2/1971 | Bobart | H05B 6/104 |
| | | | 219/646 |
| 3,604,696 A | 9/1971 | Coleman et al. | |
| 3,635,417 A | 1/1972 | Kajiwara et al. | |
| 3,793,867 A | 2/1974 | Stafford | |
| 3,837,391 A | 9/1974 | Rossi | |
| 4,054,770 A | 10/1977 | Jackson et al. | |
| 4,185,183 A | 1/1980 | Kamimoto | |
| 4,214,467 A | 7/1980 | Sankaran | |
| 4,296,919 A | 10/1981 | Sakurai et al. | |
| 4,321,444 A | 3/1982 | Davies | |
| 4,448,614 A * | 5/1984 | Morimoto | C21D 9/573 |
| | | | 134/15 |
| 4,520,645 A | 6/1985 | Ross et al. | |
| 4,708,325 A | 11/1987 | Georges | |
| 4,730,781 A | 3/1988 | Richter et al. | |
| 4,743,196 A | 5/1988 | Imose et al. | |
| 4,761,527 A | 8/1988 | Mohr | |
| 4,795,872 A | 1/1989 | Hagisawa et al. | |
| 4,828,227 A | 5/1989 | Georges et al. | |
| 4,891,484 A | 1/1990 | Waggott et al. | |
| 4,923,396 A | 5/1990 | Harada et al. | |
| 5,397,877 A | 3/1995 | Couffet et al. | |
| 5,401,941 A | 3/1995 | Mauve et al. | |
| 5,701,775 A | 12/1997 | Sivilotti et al. | |
| 5,739,506 A | 4/1998 | Hanton et al. | |
| 5,914,056 A | 6/1999 | Yamaguchi | |
| 5,914,065 A | 6/1999 | Alavi | |
| 6,011,245 A | 1/2000 | Bell | |
| 6,019,200 A * | 2/2000 | Janzen | B21C 47/003 |
| | | | 188/163 |
| 6,129,136 A | 10/2000 | Tibbs et al. | |
| 6,264,765 B1 | 7/2001 | Bryant et al. | |
| 6,285,015 B1 * | 9/2001 | Doizaki | C21D 9/60 |
| | | | 219/635 |
| 6,327,883 B1 | 12/2001 | Noe et al. | |
| 6,570,141 B2 | 5/2003 | Ross | |
| 6,576,878 B2 | 6/2003 | Thorpe et al. | |
| 7,525,073 B2 | 4/2009 | Lovens et al. | |
| 7,671,307 B2 | 3/2010 | Nikanorov et al. | |
| 7,819,356 B2 | 10/2010 | Takatsuka et al. | |
| 7,942,191 B2 * | 5/2011 | Zhang | C21D 1/74 |
| | | | 148/541 |
| 8,502,122 B2 | 8/2013 | Hirota | |
| 8,592,735 B2 | 11/2013 | Hirota | |
| 9,462,641 B2 | 10/2016 | Akers | |
| 2006/0037989 A1 | 2/2006 | Zilkenat et al. | |
| 2006/0070689 A1 | 4/2006 | Kropfl | |
| 2007/0193322 A1 | 8/2007 | Beck et al. | |
| 2009/0026303 A1 | 1/2009 | Schmitz et al. | |
| 2009/0101636 A1 | 4/2009 | Lovens et al. | |
| 2010/0050730 A1 | 3/2010 | Buschsieweke et al. | |
| 2010/0237548 A1 | 9/2010 | Okada et al. | |
| 2012/0074132 A1 | 3/2012 | Chen et al. | |
| 2014/0147697 A1 | 5/2014 | Berkhout et al. | |
| 2016/0016215 A1 | 1/2016 | Brown et al. | |
| 2018/0085803 A1 | 3/2018 | Hobbis et al. | |
| 2018/0085805 A1 | 3/2018 | Pralong et al. | |
| 2018/0085810 A1 | 3/2018 | Malpica et al. | |
| 2018/0087122 A1 | 3/2018 | Custers | |
| 2018/0087138 A1 | 3/2018 | Gaensbauer et al. | |
| 2018/0092163 A1 | 3/2018 | Pralong et al. | |

(56) References Cited

U.S. PATENT DOCUMENTS

FOREIGN PATENT DOCUMENTS

| | | | |
|---|---|---|---|
| CN | 201596682 U | 10/2010 | |
| DE | 857787 C | 12/1952 | |
| DE | 1163760 B | 2/1964 | |
| DE | 102006054383 A1 | 5/2008 | |
| EA | 012474 B1 | 10/2009 | |
| EP | 1221826 B1 | 2/2006 | |
| EP | 1604549 B1 | 8/2006 | |
| EP | 2112863 A1 | 10/2009 | |
| EP | 2157193 A1 | 2/2010 | |
| EP | 2233593 A2 | 9/2010 | |
| EP | 2434836 A2 | 3/2012 | |
| EP | 2478974 A1 | 7/2012 | |
| EP | 2800452 B1 | 7/2016 | |
| FR | 1347484 A | 12/1963 | |
| FR | 1387653 A | 1/1965 | |
| FR | 2780846 A1 | 9/2000 | |
| GB | 167545 A | 8/1921 | |
| GB | 600673 A | 4/1948 | |
| GB | 609718 A | 10/1948 | |
| GB | 988334 A | 4/1965 | |
| GB | 2114101 A | 8/1983 | |
| GB | 2121260 A | 12/1983 | |
| JP | S4934459 A | 3/1974 | |
| JP | S51-68460 A | 6/1976 | |
| JP | S56102567 A | 8/1981 | |
| JP | S58193351 A | 11/1983 | |
| JP | S6486474 A | 3/1989 | |
| JP | H02209457 A | 8/1990 | |
| JP | H0375344 A | 3/1991 | |
| JP | H0375345 A | 3/1991 | |
| JP | H04112485 * | 4/1992 | ........... C22F 1/04 |
| JP | H04112485 A | 4/1992 | |
| JP | H05-76932 A | 3/1993 | |
| JP | H0527041 U | 4/1993 | |
| JP | H0582248 A | 4/1993 | |
| JP | H0549117 U | 6/1993 | |
| JP | H07328719 | 12/1995 | |
| JP | H09-122752 A | 5/1997 | |
| JP | 2002529245 | 9/2002 | |
| JP | 2016141843 A | 8/2016 | |
| KR | 20120116988 A | 10/2012 | |
| RU | 1784319 A1 | 12/1992 | |
| RU | 2333065 C2 | 9/2008 | |
| RU | 97889 U1 | 9/2010 | |
| RU | 2504574 C2 | 1/2014 | |
| RU | 2539962 C2 | 1/2015 | |
| SU | 1005958 A | 3/1983 | |
| SU | 1316725 A1 | 6/1987 | |
| WO | 2007138152 A1 | 12/2007 | |
| WO | 2010091865 | 8/2010 | |
| WO | 2012084638 A1 | 6/2012 | |
| WO | 2015094482 A1 | 6/2015 | |
| WO | 2016035867 A1 | 3/2016 | |
| WO | 2016035893 A1 | 3/2016 | |

OTHER PUBLICATIONS

The Aluminum Association, Inc., "International Alloy Designations and Chemical Composition Limits for Wrought Aluminum and Wrought Aluminum Alloys," Registration Record Series: Teal Sheets, Feb. 1, 2009, 35 pages, The Aluminum Association, Inc.
First Examination Report issued in Australian Patent Application No. 2017336528 dated Jul. 18, 2019, 3 pages.
Russian Patent Application No. 2019108199, "Office Action", dated Jan. 14, 2020, 8 pages.
Zerbetto, "Optimal Design of a Permanent Magnet Heater for Aluminum Billets", 2014 Flux Conference, Inovalab s.r.l., Oct. 15, 2014, 23 pages.
Russian Application No. 2019108199, "Notice of Decision to Grant", dated Mar. 25, 2020, 15 pages.
European Patent Application No. 17791198.9, "Office Action", dated Mar. 16, 2020, 5 pages.
Japanese Patent Application No. 2019-537056, "Office Action", dated May 26, 2020, 8 pages.
Application No. CN201780058039.0, Office Action, dated Aug. 4, 2020, 15 pages.
Korean Patent Application No. 10-2019-7010992, Office Action, dated Aug. 13, 2020, 13 pages.

* cited by examiner

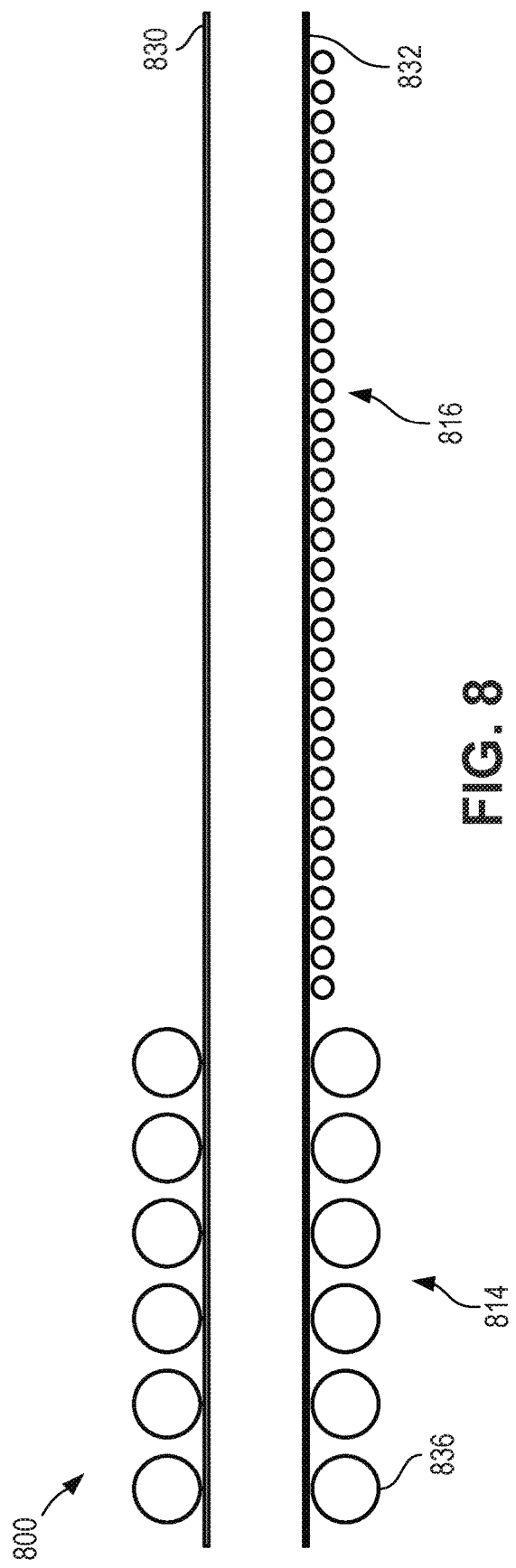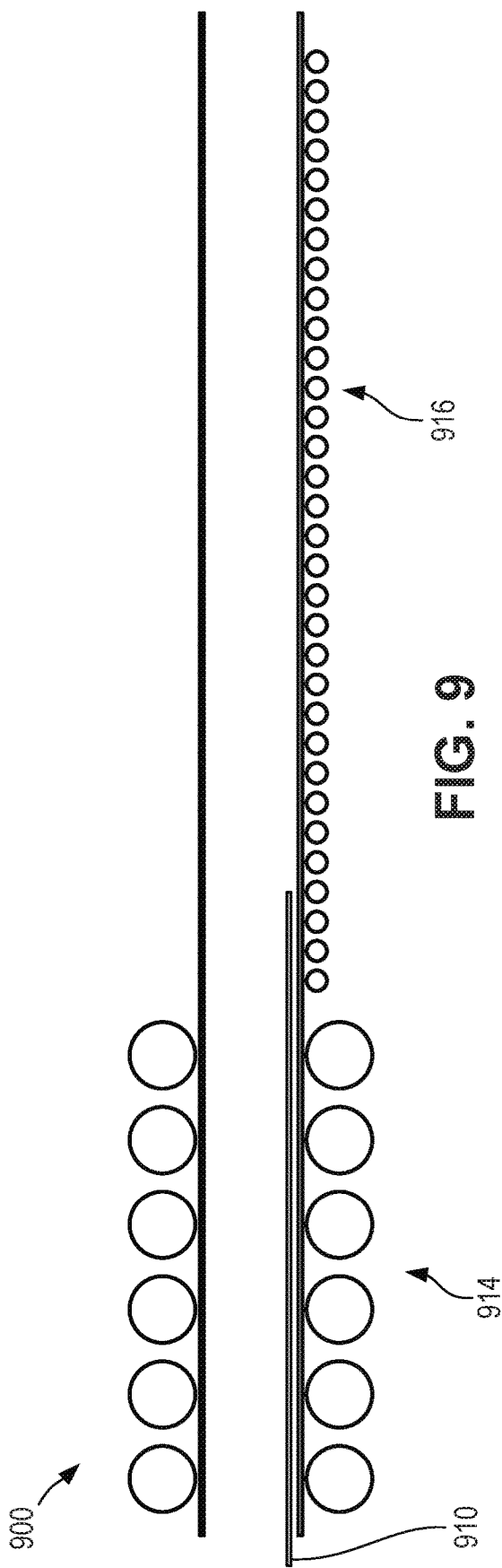

MAGNETIC LEVITATION HEATING OF METAL WITH CONTROLLED SURFACE QUALITY

CROSS REFERENCE TO RELATED APPLICATIONS

The present application claims the benefit of U.S. Provisional Patent Application No. 62/400,426 entitled "ROTATING MAGNET HEAT INDUCTION" and filed on Sep. 27, 2016; and U.S. Provisional Patent Application No. 62/505,948 entitled "ROTATING MAGNET HEAT INDUCTION" and filed on May 14, 2017, the disclosures of which are hereby incorporated by reference in their entireties.

Additionally, the present application is related to U.S. Non-provisional patent application Ser. No. 15/716,887 to Antoine Jean Willy Pralong, et al. entitled "ROTATING MAGNET HEAT INDUCTION" filed Sep. 27, 2017; U.S. Non-provisional patent application Ser. No. 15/716,559 to Antoine Jean Willy Pralong, et al. entitled "SYSTEMS AND METHODS FOR NON-CONTACT TENSIONING OF A METAL STRIP" filed Sep. 27, 2017; U.S. Non-provisional patent application Ser. No. 15/716,577 to David Michael Custers entitled "PRE-AGEING SYSTEMS AND METHODS USING MAGNETIC HEATING" filed Sep. 27, 2017; U.S. Non-provisional patent application Ser. No. 15/716,608 to David Anthony Gaensbauer, et al. entitled "COMPACT CONTINUOUS ANNEALING SOLUTION HEAT TREATMENT" filed Sep. 27, 2017; and U.S. Non-provisional patent application Ser. No. 15/716,570 to Julio Malpica, et al. entitled "RAPID HEATING OF SHEET METAL BLANKS FOR STAMPING" filed Sep. 27, 2017, the disclosures of which are hereby incorporated by reference in their entireties.

TECHNICAL FIELD

The present disclosure relates to metallurgy generally and more specifically to heating and processing metal articles, such as aluminum metal strips or slabs.

BACKGROUND

In metal processing, it can be desirable to control the temperature of a metal article before, during, or after various processing steps. For example, it can be desirable to heat a metal slab prior to performing certain processes (e.g., rolling), or it can be desirable to maintain heat in a metal strip for a duration of time without allowing the metal strip to cool past a minimum temperature. Temperature control can generally involve adding or removing heat energy to or from a metal strip.

Various techniques for adding heat energy to a metal article exist. Certain heating techniques, especially direct-contact techniques, can induce undesirable effects on the metal article, such as surface-marring, build-up of waste (e.g., carbon from a direct-impingement flame) on the surface, or other such undesirable results. Some techniques attempt to heat up the metal article without contact, but are unable to efficiently transfer heat energy to the metal strip. Some other problems associated with current techniques include requiring high installation and/or maintenance costs, occupying significant production space, limiting the mobility of the metal article being processed, and inducing undesirable effects on the metal article.

Additionally, it can be important to maintain desirable surface characteristics during and after a heating process. Using equipment that contacts the surface of a metal article, especially during and immediately after heating the metal article to an elevated temperature, can produce undesirable surface defects. Further, heating metal articles when exposed to certain gases, such as humid air, can cause undesirable surface defects in the metal article.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Examples of the present disclosure include a heating apparatus, comprising: a heating zone for accepting a metal article, wherein the heating zone comprises at least one heating device for increasing a temperature of the metal article; and a flotation zone coupled to the heating zone for maintaining the temperature of the metal article, the flotation zone comprising an array of rotating magnets positioned to levitate the metal article during a heating operation.

In some cases, the array of rotating magnets is an array of rotating permanent magnets. In some cases, the heating zone and the flotation zone occupy the same space. In some cases, the at least one heating device comprises at least one of the array of rotating magnets. In some cases, the flotation zone is located immediately after the heating zone in a downstream direction, wherein the heating zone includes an entrance for continuously accepting the metal article, and wherein the flotation zone includes an exit for continuously outputting the metal article. In some cases, the at least one heating device comprises one or more induction coils. In some cases, the at least one heating device comprises an additional array of rotating magnets. In some cases, the additional array of rotating magnets is an additional array of rotating permanent magnets. In some cases, the array of rotating magnets includes a plurality of rotors each comprising a plurality of laterally spaced-apart rotating magnets. In some cases, the apparatus further comprises: a temperature sensor positioned to measure a temperature of the metal article; and a controller coupled to the temperature sensor and the at least one heating device to control the at least one heating device based on a sensed temperature. In some cases, the apparatus further comprises one or more cooling nozzles coupled to a source of coolant fluid and positioned to dispense the coolant fluid on the metal article. In some cases, the apparatus further comprises a temperature sensor positioned to measure a temperature of the metal article; and a controller coupled to the temperature sensor and the one or more cooling nozzles to control an amount of coolant fluid dispensed by the one or more cooling nozzles. In some cases, the array of rotating magnets rotate about an axis of rotation that is parallel a lateral width of the metal article. In some cases, the apparatus further comprises a chamber for accepting a gas, wherein the metal article is positioned within the chamber during the heating operation, and wherein the array of rotating magnets is positioned opposite a wall of the chamber from the metal article. In some cases, the chamber includes a top wall separable from a bottom wall to facilitate threading of the metal article into the heating zone. In some cases, the chamber is made of an electrically non-conductive, thermally insulating material. In some cases, the chamber includes one or more ports connecting the chamber to a supply of inert gas.

Examples of the present disclosure include a method, comprising: positioning a metal article in a heating zone of a heating apparatus; heating the metal article to a setpoint temperature using a heating device in the heating zone; levitating the metal article in a flotation zone, wherein levitating the metal article comprises rotating at least one magnetic rotor to generate changing magnetic fields adjacent the metal article; and maintaining the setpoint temperature for a duration while the metal article is being levitated in the flotation zone.

In some cases, each of the at least one magnetic rotors comprises one or more permanent magnets rotatable about an axis of rotation. In some cases, the heating zone and the flotation zone occupy the same space. In some cases, heating the metal article includes rotating one or more of the at least one magnetic rotor. In some cases, the method further comprises directing the metal article from the heating zone to the flotation zone, wherein the flotation zone is located immediately after the heating zone in a downstream direction, wherein positioning the metal article in the heating zone includes continuously accepting the metal article into the heating zone. In some cases, heating the metal article includes passing the metal article through one or more induction coils. In some cases, heating the metal article includes rotating at least one additional magnetic rotor. In some cases, each of the at least one additional magnetic rotor comprises one or more permanent magnets rotatable about an axis of rotation. In some cases, each of the at least one magnetic rotors comprises a plurality of laterally spaced-apart magnets rotatable about an axis of rotation. In some cases, the method further comprises measuring a temperature of the metal article using a temperature sensor; and controlling the heating device based on the measured temperature. In some cases, the method further comprises providing coolant fluid to the metal article using one or more cooling nozzles. In some cases, the method further comprises measuring a temperature of the metal article using a temperature sensor; and controlling the dispensing of the coolant fluid based on the measured temperature. In some cases, each of the at least one magnetic rotors rotates about an axis of rotation that is parallel a lateral width of the metal article. In some cases, providing the metal article to the heating zone includes providing the metal article to a gas-filled chamber, and levitating the metal article includes generating the changing magnetic fields through the gas-filled chamber. In some cases, the method further comprises threading the metal article into the gas-filled chamber, wherein threading the metal article comprises: separating a top wall and a bottom wall of the gas-filled chamber; inserting the metal article between the top wall and the bottom wall; and re-setting the top wall and the bottom wall together. In some cases, levitating the metal article includes generating the changing magnetic fields through electrically non-conductive, thermally insulating material of the gas-filled chamber. In some cases, the method further comprises supplying inert gas to the gas-filled chamber.

Other objects and advantages will be apparent from the following detailed description of non-limiting examples.

BRIEF DESCRIPTION OF THE DRAWINGS

The specification makes reference to the following appended figures, in which use of like reference numerals in different figures is intended to illustrate like or analogous components.

FIG. 8 is a schematic diagram depicting a heating apparatus in an open configuration prior to threading a metal article according to certain aspects of the present disclosure.

FIG. 9 is a schematic diagram depicting a heating apparatus in an open configuration while a metal article is being threaded into the heating apparatus according to certain aspects of the present disclosure.

DETAILED DESCRIPTION

Figure 1:
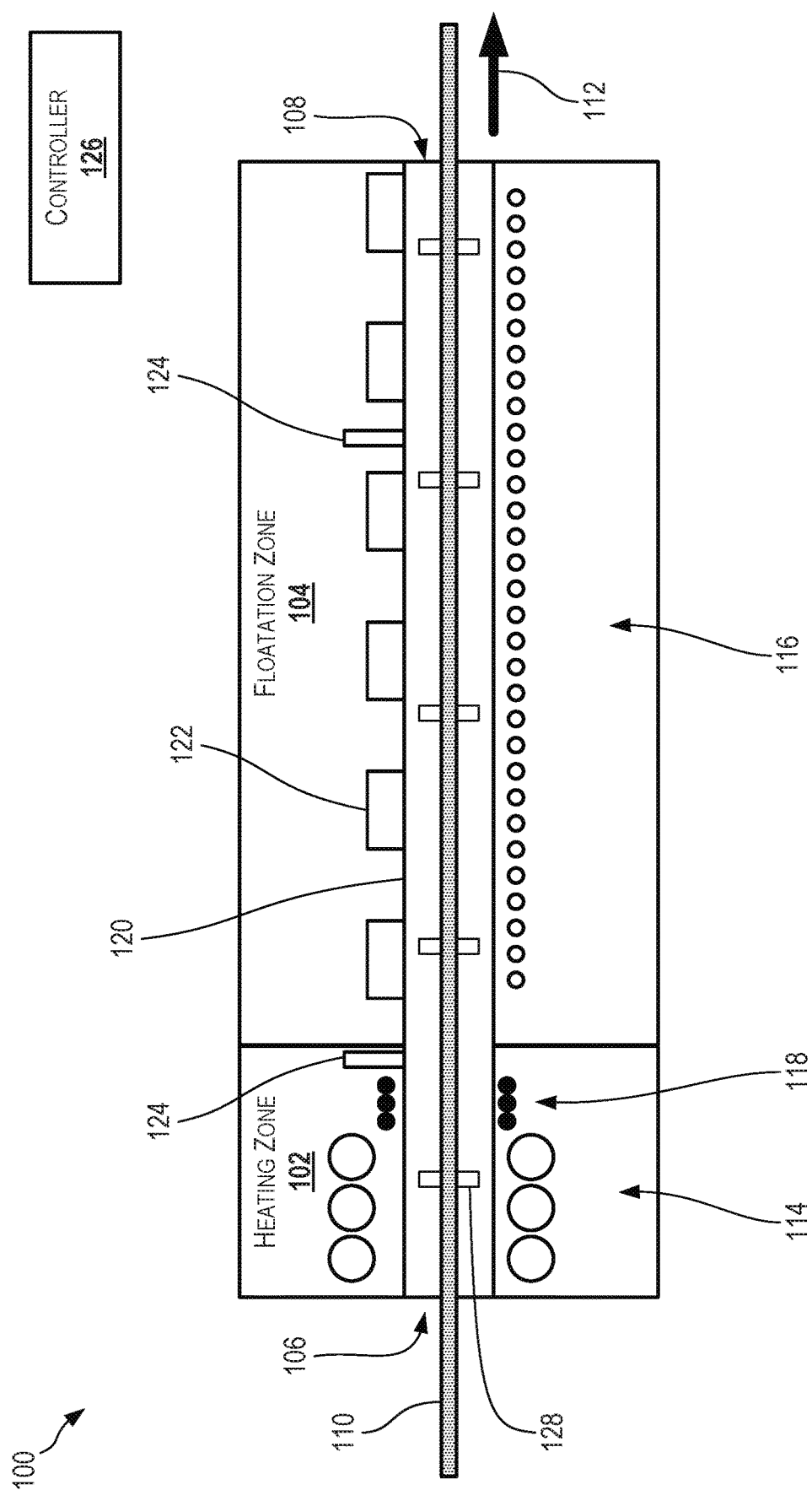
FIG. 1 is a schematic diagram depicting a side view of a continuous, non-contact heating apparatus according to certain aspects of the present disclosure.

Certain aspects and features of the present disclosure relate to a heating apparatus that uses a series of rotating magnets to heat, levitate, and/or move metal articles therethrough. The heating apparatus can be a tunnel oven, soaking furnace, or other suitable heating device. A first series of rotating magnets can heat the metal article to a desired temperature. A second series of rotating magnets can levitate the metal article within the heating apparatus and maintain desired tension in the metal article, and can also urge the metal article through the heating apparatus. The heating apparatus can extend sufficiently far to soak the metal article at the desired temperature for a desired duration. In some cases, the rotating magnets can be positioned outside of an electrically non-conductive, heat resistant chamber filled with an inert or mildly reactive gas, through which the metal article passes in the heating apparatus.

The heating apparatus can be an ultra-compact heating oven for metal articles, such as metal slabs, strips, or other objects. In some cases, the heating apparatus may be used with non-ferrous materials, including aluminum, aluminum alloys, magnesium, magnesium-based materials, titanium, titanium-based materials, copper, copper-based materials, steel, steel-based materials, bronze, bronze-based materials, brass, brass-based materials, composites, sheets used in composites, or any other suitable metal, non-metal or combination of materials. The article may include monolithic materials, as well as non-monolithic materials such as roll-bonded materials, clad materials, composite materials (such as but not limited to carbon fiber-containing materials), or various other materials. In one non-limiting example, the heating apparatus can be used to heat metal articles such as aluminum metal strips, slabs or other articles made from aluminum alloys, including aluminum alloys containing iron.

The heating apparatus can rapidly heat a metal article in a non-contact manner, optionally within an inert atmosphere. The heating apparatus can be configured as a continuous heating apparatus or a non-continuous heating apparatus. A continuous heating apparatus can continuously accept the metal article at an upstream end and continuously output the treated metal article at a downstream end for further processing and/or handling. In an example, a continuous heating apparatus can be placed in a processing line between a continuous casting device and a coiler. A non-continuous heating apparatus can heat sequentially metal articles having distinct lengths. For example, a non-continuous heating apparatus can accept a metal slab of a defined length, heat the entire metal slab at once, then have the treated metal slab removed before a new metal slab is placed in the non-continuous heating apparatus.

As used herein, the terms "above," "below," "vertical," and "horizontal" are used to describe relative orientations with respect to a metal article, such as a metal strip, as if the metal article were moving in a horizontal direction with its top and bottom surfaces generally parallel to the ground. The term "vertical" as used herein can refer to a direction perpendicular to a surface (e.g., top or bottom surface) of the metal article, regardless of the orientation of the metal article. The term "horizontal" as used herein can refer to a direction parallel to a surface (e.g., top or bottom surface) of the metal article, such as a direction parallel to the direction of travel of a moving metal article, regardless of the orientation of the metal article. The terms "above" and "below" can refer to locations beyond top or bottom surfaces of a metal article, regardless of the orientation of the metal article. The metal article can be oriented in or moving in any suitable direction, including horizontal, vertical, and other directions, such as diagonal.

As used herein, the terms vertical, longitudinal, and lateral can be used with reference to the metal article being heated. The longitudinal direction can extend along a direction of travel of a metal article through processing equipment, such as along a passline through a continuous annealing solution heat treatment (CASH) line or other equipment. The longitudinal direction can be parallel to the top and bottom surfaces of the metal article. The longitudinal direction can be perpendicular to the lateral direction and the vertical direction. The lateral direction can extend between the side edges of the metal article. The lateral direction can extend in a direction perpendicular to the longitudinal direction and the vertical direction. The vertical direction can extend between the top and bottom surfaces of the metal article. The vertical direction can be perpendicular to the longitudinal direction and the lateral direction.

Aspects and features of the present disclosure can be used with any suitable metal articles, such as in the form of foils, sheets, strips, slabs, plates, shates, or other metal articles. The aspects and features of the present disclosure can be especially suitable for any metal article having flat surfaces (e.g., flat top and bottom surfaces). The aspects and features of the present disclosure can be especially suitable for any metal product having parallel or approximately parallel opposing surfaces (e.g., top and bottom surfaces). Approximately parallel can include parallel or within 1°, 2°, 3°, 4°, 5°, 6°, 7°, 8°, 9°, or 10° of parallel, or similar.

Aspects and features of the present disclosure can be used with metal articles of any suitable metal. In some cases, the metal article is aluminum, such as an aluminum alloy. In some cases, the metal article can be an aluminum alloy containing iron. Certain aspects and features of the present disclosure may be especially suitable for use with 6xxx or 5xxx series aluminum alloy, although other alloys such as 1xxx, 2xxx, 3xxx, 4xxx, 7xxx or 8xxx series alloys can be used. 6xxx and 5xxx series aluminum alloys can have conductivities of approximately 10,000,000 Siemens per meter (10 MS/m). In some cases, alloys having higher conductivities, such as 15 MS/m or 20 MS/m, can result in less efficient heating through rotating magnets, due at least in part to the generation of less secondary magnetic flux (e.g., magnetic flux generated by the metal article) to oppose the primary flux (e.g., magnetic flux generated by the rotating magnets).

Arrays of rotating magnets provide both heating and levitation of the metal article within the heating apparatus. A heating zone can include an first array of rotating magnets that are configured and positioned to provide rapid heating to the metal article. A flotation zone, and optionally the heating zone, can include a second array of rotating magnets that are configured and positioned to levitate the metal article. Rotating magnets can be used on any suitable metal article capable of generating eddy currents in the presence of moving and time varying magnetic fields, but may be especially suitable for use with aluminum metal strips or slabs.

Each rotating magnet can include one or more magnetic sources, such as permanent magnets or electromagnets. Rotating magnets can generally contain only permanent magnets, although in some cases rotating magnets can instead contain electromagnets or a combination of electromagnets and permanent magnets. Permanent magnet rotating magnets may be preferable in some cases and may be able to achieve more efficient results than rotating magnets relying on electromagnets. Each rotating magnet can rotate about an axis of rotation that is perpendicular a longitudinal axis of the metal article passing adjacent the rotating magnet, although other axes of rotation can be used. In other words, each magnetic rotor can rotate about an axis of rotation that is perpendicular a processing direction (e.g., a rolling direction) of the metal article, although other axes of rotation can be used. In some cases, an axis of rotation can be perpendicular a processing direction and coplanar a lateral width of the metal strip, in which case the axis of rotation can be intentionally angled (e.g., angled with one end of the magnetic rotor closer the metal strip than the other end) to achieved desired control over the temperature profile in the metal article. In some cases, an axis of rotation of a magnetic rotor can be perpendicular a height of the metal strip and can fall within an plane parallel and spaced apart from a plane formed by the lateral width of the metal strip and the processing direction, in which case the axis of rotation can be intentionally angled (e.g., angled with one end of the magnetic rotor further downstream than the other end) to achieved desired control over the temperature profile in the metal article. In some cases, the axis of rotation of a magnetic rotor can be otherwise angled. The rotational movement of a rotating magnet causes its magnet source(s) to induce a moving or changing magnetic field. The rotating magnets can be rotated through any suitable method, including through a rotor motor (e.g., electric motor, pneumatic motor, or otherwise) or sympathetic movement of a nearby magnetic source (e.g., another rotating magnet or changing magnetic field).

As used herein, the term rotating magnet can be inclusive of a magnetic rotor, containing one or more magnets thereon. For example, a single rotor can include a single magnetic source and thus contain two magnetic poles, or a single rotor can include multiple magnetic sources and thus contain multiple magnetic poles. In some cases, the magnetic sources of a single rotor can be arranged to produce directionally asymmetric magnetic fields, such as permanent magnet magnetic sources arranged in a Halbach array for directing magnetic fields out from an outer circumference of the magnetic rotor.

In some cases, a magnetic rotor is circular in cross section, with the magnetic sources rotatable about a single axis of rotation. In some cases, however, a magnetic rotor can be elliptical or otherwise non-circular in cross section, with the magnetic sources rotatable about more than a single axis of rotation. In such cases, the magnetic rotor can take the form of a belt or tread having magnets that sequentially rotate about more than one axis of rotation (e.g., two axes of rotation in the case of a simple ellipsoidal belt).

Precise heating control can be achieved when using rotating magnets to heat the metal article without physically contacting the metal article. Such precise control can be achieved through manipulation of various factors associated with the rotating magnets, including strength of magnetic sources, number of magnetic sources, orientation of magnetic sources, size of magnetic sources, size of the rotating magnet itself (e.g., including any shell), speed of the rotating magnet (e.g., rotational speed), vertical gap between vertically offset rotating magnets (e.g., vertically offset rotors in a single rotor set), laterally offset placement of vertically offset rotating magnets (e.g., laterally offset placement of rotors in a single rotor set), longitudinal gap between adjacent rotating magnets, thickness of the article being heated, vertical distance between each rotating magnet and the article being heated, composition of the article being heated, presence of magnetic shielding (e.g., certain flux focusing elements), thickness of and/or permeability of magnetic shielding, forward speed of the article being heated, and number of rotating magnets used. Other factors can be controlled as well. Control of these and other factors can be static (e.g., set before a heating process) or dynamic (e.g., changeable on-the-fly during a heating process). In some cases, control of one or more of the aforementioned factors, among others, can be based on a computer model, operator feedback, or automatic feedback (e.g., based on signals from real-time sensors). As used herein, the term "heating process" can include both heating and floating or soaking a metal article.

In some cases, magnetic rotors can be used to achieve a uniform temperature profile across the metal strip (e.g., across a lateral width of the metal strip). In some cases, techniques can be used to optimize the uniformity of the temperature profile across the metal strip. Examples of such techniques can include the use of auxiliary heaters over cold spots; the use of additional, smaller magnetic rotors adjacent cold spots; the use of flux diverters to divert magnetic flux away from regions with warm sports and/or to regions of cold spots; lateral movement of magnetic rotors with respect to one another and/or with respect to a centerline of the metal strip; and magnetic rotors with tailored magnetic flux profiles (e.g., magnetic flux profiles that vary in a specific fashion along the length of the magnetic rotor).

As used herein, aspects and features of the heating zone are described with reference to rotating magnets. In some cases, however, non-rotating electromagnets can be used in the heating zone in addition to or instead of rotating magnets. However, the use of rotating magnets, as opposed to stationary electromagnets, to generate changing magnetic fields can provide improved efficiency, as well as more even heating of the metal article. Using stationary electromagnets to vary inductive fields imparted across the width of the article can generate localized hotspots in the article. Inductive fields of various intensities can be caused by the natural variance in the windings of different stationary electromagnets. Variances in electromagnet windings can result in some locations generating more heat than adjacent lateral locations. Localized hotspots can unevenly deform the article and can cause other manufacturing defects. By contrast, while permanent magnets may include some level of inherent magnetic variance across dimensions or from one magnet to another, some or all of this variance can be automatically averaged out due to the rotation of the magnetic sources in the rotating magnet or rotor. No single permanent magnet is being held at any laterally stationary position, and thus an average magnetic field is being applied by the rotating permanent magnets. Thus, the rotating magnetic rotor is able to heat the metal article evenly in a more controlled manner. When electromagnets are used in a rotating magnet heater, variances between different electromagnets can be averaged out due to rotation of the rotor. This averaging-out of the variances does not occur with stationary electromagnets.

Rotating magnets can rotate in a "downstream" direction or an "upstream" direction. As used herein, a rotating magnet rotating in a downstream direction rotates such that the surface of the rotating magnet nearest the metal article at any point in time is moving in the direction of travel of the metal article (e.g., generally towards the downstream direction). For example, when looking at a metal article from the side with the metal article moving in its longitudinal direction of travel to the right, a rotating magnet positioned above the metal article rotating in a downstream direction can rotate counterclockwise while a rotating magnet positioned below the metal article and rotating in a downstream direction can rotate clockwise. As used herein, a rotating magnet rotating in an upstream direction rotates such that the surface of the rotating magnet nearest the metal article at any point in time is moving opposite the direction of travel of the metal article (e.g., generally towards the upstream direction). For example, when looking at a metal article from the side with the metal article moving in its longitudinal direction of travel to the right, a rotating magnet positioned above the metal article rotating in an upstream direction can rotate clockwise while a rotating magnet positioned below the metal article and rotating in an upstream direction can rotate counterclockwise.

In cases where the heating apparatus is a non-continuous heating apparatus, the term "upstream" can be replaced with "towards a first end" and the term "downstream" can be replaced with "towards a second end," where the first end and the second end of the non-continuous heating apparatus can equate to an upstream end and a downstream end of a continuous heating apparatus.

The rotating magnets can be positioned above or below the metal article (e.g., above or below the passline or above or below the chamber). As used herein, reference to an element being positioned with respect to the metal article can refer to that element being positioned with respect to a passline (e.g., desired passline along which the metal article is desired to travel), as appropriate. In some cases, the array of rotating magnets for heating the metal article can be positioned both below and above the metal article. In some cases, these rotating magnets are placed in matched pairs, with similar rotating magnets (e.g., similar or the same size, strength, rotation speed, and/or upstream or downstream rotation direction) placed directly opposite the passline from one another. When opposing rotating magnets are placed on opposite sides of the metal article and spinning in the same downstream or upstream direction, one of the two rotating magnets can be rotating in a clockwise direction while the other of the two rotating magnets can be rotating in a counterclockwise direction.

The rotating magnets for heating can have a length that is approximately equal to or greater than the width of the metal article. In some cases, the rotating magnets for heating can be laterally displaced to occupy less than 100% of the lateral width of the metal strip. The rotating magnets for levitating (e.g., rotating magnets in the flotation zone) can occupy less than 100% of the lateral width of the metal strip, such as at or less than approximately 95%, 90%, 85%, 80%, 75%, 70%, 65%, 60%, 55%, 50%, 45%, 40%, 35%, or 30% of the lateral width of the metal strip. In some cases, a single rotor in the flotation zone can house two or more rotating magnets laterally spaced apart from one another. In some cases, the lateral position of rotating magnets within sequential rotors (e.g., longitudinally spaced apart and sequential rotors) in the flotation zone can be offset from one another, resulting in a staggered array of rotating magnets in the flotation zone. The staggered nature of the rotating magnets can help minimize undesired and uneven heating in the flotation zone.

In some cases, the array of rotating magnets for levitating the metal article may be positioned only below the metal article, although that need not be the case. In some cases, rotating magnets can be positioned above the metal article to aid in directing or steering the metal article. For example, rotating magnets can be placed at or near the edges of the metal article, including just past the edges of the metal article, and rotated along an axis of rotation parallel to the longitudinal axis of the metal article to induce forces towards a longitudinal centerline of the desired path through the heating apparatus. These rotating magnets can facilitate centering the metal article. These centering rotating magnets can be placed at any suitable location, such as at or adjacent the entry or exit to the heating apparatus. In some cases, centering rotating magnets can be used to stabilize the metal article in longer heating apparatuses, when the metal article is supported under low tensions, or when the metal article is supported under compression.

In some cases, one or more contact rollers can be positioned adjacent the metal strip to support the metal strip in cases where levitation is lost. These contact rollers may make no contact during normal operation of the flotation zone.

In some cases, arrays of rotating magnets (e.g., heating and/or levitating arrays) only below the metal article may be especially suitable for thicker metal articles (e.g., thicker than approximately 10 mm). In some cases, arrays of rotating magnets (e.g., heating and/or levitating arrays) above and below the metal article may be especially suitable for thinner metal articles (e.g., at or thinner than approximately 10 mm).

In some cases, when rotating magnets are used below and above the metal article, the rotating magnets positioned above the metal article can be actuatable between a closed position and an open position. In the closed position, the rotating magnets, and optionally any top walls of the chamber, can be in position for normal operation. In the open position, the top rotating magnets, and optionally any top walls of the chamber, can be moved away from a normal operating position to provide more room for a metal article to be loaded or threaded into the heating apparatus. Once the metal article has been loaded, the top rotating magnets, and optionally any top walls of the chamber, can be moved back to the closed position for normal operation.

In some cases, magnetic flux focusing elements can be used adjacent the rotating magnets to redirect magnetic flux away from or towards certain regions. A magnetic flux focusing element can be any suitable material capable of redirecting magnetic flux, including concentrating magnetic flux. The magnetic flux focusing elements can receive magnetic flux from magnetic sources in the rotating magnets that are not near or directly facing the article and redirect that magnetic flux towards the article (e.g., in a direction perpendicular to a top or bottom surface of the article). Magnetic flux focusing elements can also provide benefits of providing magnetic shielding between the rotating magnet and adjacent equipment other than the metal article being heated. For example, magnetic flux focusing elements can allow adjacent, longitudinally offset, rotating magnets to be placed closer to one another with less magnetic interaction between the two. Magnetic flux focusing elements can be made of any suitable material, including silicon alloyed steel (e.g., electrical steel). A magnetic flux focusing element may comprise multiple laminations. Magnetic flux focusing elements can be flux diverters or flux controllers. When magnetic flux focusing elements are used, the rotating magnets may be able to achieve efficient results at lower rotational speeds and the magnets may be able to be placed further from the metal article.

Rotating magnets can also be used to control tension in the metal article. A rotating magnet rotating in a downstream direction can apply downstream force on the metal article, while a rotating magnet rotating in an upstream direction can apply upstream force on the metal article. Multiple rotating magnets longitudinally spaced apart can counteract some or all of any tension induced in the metal article by one another. For example, a first rotating magnet rotating to induce longitudinal tension in a metal article can be spaced apart form a second rotating magnet rotating in an opposite direction such that the longitudinal tension can be reduced or eliminated. Thus, tension in the metal article can be controlled through control of the rotating magnets, as described herein (e.g., position, speed, direction, strength, gap between opposing rollers, and other such parameters).

In some cases, the heating apparatus can maintain an inert atmosphere around the metal article during heating in the heating zone and/or soaking in the flotation zone. The inert atmosphere can contain inert gases, such as nitrogen or argon, or can contain minimally reactive gases, such as dry air. The inert atmosphere can be contained within walls of the heating apparatus itself, or within a separate chamber. In cases where the heating apparatus is a non-continuous heating apparatus, the chamber can be fully enclosed, although that need not be the case. In cases where the heating apparatus is a continuous heating apparatus, the chamber can remain open at an upstream end and a downstream end, permitting the metal article to enter and exit the chamber continuously. The top and bottom walls of the chamber (e.g., walls adjacent to and parallel with the top and bottom surfaces of the metal article, or walls perpendicular the thickness of the metal article), and optionally the side walls (e.g., walls perpendicular the lateral width of the metal article), and optionally the end walls (e.g., walls perpendicular a longitudinal axis of the metal article), if present, can be made of non-conductive and heat-resistant materials, such as Kevlar® or other para-aramids. The rotating magnets can be positioned outside of the chamber and the changing magnetic fields induced by the rotating magnets can pass through the chamber walls to provide heating and/or levitation to the metal article within. Inert gases or minimally reactive gases can be fed into the chamber at the ends and/or at insertion points along the chamber. These gases can be dispensed into the chamber through nozzles. In some cases, these nozzles can be positioned to supply the gases in a fashion designed to facilitate floating the metal article within the chamber.

In some cases, hot gases can be supplied to supplement heating from the rotating magnets. Such hot gases can be inert or minimally reactive gases. The hot gases can be supplied through directed ports aimed at regions where magnetic heating does not fully heat the metal article. The hot gases can facilitate equalizing temperature in the metal article as well as providing the inert or minimally reactive atmosphere within the heating apparatus or within the chamber.

In some cases, a vacuum source can be coupled to the chamber to establish a full or partial vacuum in the chamber. In some cases, sealing rollers can be used to establish a seal at upstream and downstream ends of the chamber. In some cases, the sealing rollers may be located upstream of the heating zone and downstream of the quenching zone.

In some cases, other techniques can be used to supplement or replace heating from the rotating magnets in the heating zone. In some cases, heating in the heating zone can be provided through the use of induction heating to supplement or replace heating by rotating magnets.

Optionally, coolant nozzles can be positioned within the heating apparatus to dispense coolant onto the metal article. The dispensed coolant can help maintain a desired temperature in the metal article. For example, the second array of rotating magnets responsible for levitating the metal article can provide some amount of heat to the metal article, which can be counteracted through application of coolant. As another example, dispensed coolant can be directed to portions of the metal article that may experience elevated temperatures during magnetic heating, such as edges of the metal article. In some cases, the coolant nozzles can be positioned only within the flotation zone of the heating apparatus, although in other cases coolant nozzles can be positioned throughout the heating apparatus, such as in the heating zone. In some cases, the application of coolant can be preset before a heating process begins. In some cases, the application of coolant can be dynamically controlled based on feedback from a sensor, such as a temperature sensor. Coolant can be any suitable fluid for cooling the metal article, including a coolant gas (e.g., a chilled portion of the inert gas) or a coolant liquid (e.g., water).

Optionally, treatment gases can be supplied (e.g., to the chamber) in addition to the inert atmosphere gases. For example, treatment gases, such as methane or a silane gas, can be supplied to induce passivation of the surface of the metal article within the heating apparatus.

In some cases, a heating zone with one or more magnetic rotors can be paired with a traditional flotation zone, such a flotation zone using hot air nozzles to levitate the metal article. In such cases, the magnetic rotors may be suitable for rapidly heating the metal strip and may be used to achieve a desirable tension in the metal strip suitable for flotation using hot air nozzles or other traditional techniques.

During a heating process, the rotation direction of the magnets and/or the speed of rotation can be altered to provide force to assist the advancement of the metal article through the heating apparatus, or to alter the tension or compressive forces on the metal article. For example, a slight tension can be desirable for thin metal articles (e.g., 0.5 mm to 10 mm), but a slight compressive force can be desirable for thicker metal articles (e.g., over 10 mm) to avoid breakage of the metal article at extremely high temperatures.

Certain aspects and features of the present disclosure provide a heating apparatus capable of providing faster heating than convection ovens, such as approximately five times faster than convection ovens, and with high energy efficiency (e.g., approximately 80% efficiency). Further, the rotating magnets can provide nearly instant on/off control of heat. Additionally, certain aspects and features of the present disclosure provide the ability to float the metal article during heating and/or soaking of the metal article, thus optimizing surface quality, and optionally within an inert atmosphere. Certain aspects and features of the present disclosure also are capable of providing various benefits in a very compact size. Not only can the longitudinal length of the heating apparatus be minimized due to rapid magnetic heating, but magnetic heating and levitation can permit a chamber containing the inert atmosphere to be very small, thus improving efficiency of gas usage. In some cases, certain aspects and features of the present disclosure are capable of providing other metallurgical benefits to the metal article, such as reduced surface oxidation and faster dissolution or redistribution of intermetallic phases. In some cases, certain aspects and features of the present disclosure are capable of minimizing undesirable magnesium migration during certain heating processes, which might occur if the metal article is overheated. For example, since heating a metal article with magnetic rotors induces heat generation from within the metal article itself (e.g., due to eddy currents), the reliance on external heating (e.g., air heating at the surface of the metal article) can be minimized or avoided. External heating can carry a substantial risk of overheating the metal article, especially when speed is prioritized, since heat must be transferred from the surface of the metal article into the center of the metal article for even heating. By avoiding or minimizing the use of external heating, certain aspects and features of the present disclosure enable a metal article to be heated with minimal or no risk of overheating, and thus minimal or no undesirable magnesium migration.

Certain aspects and features of the present disclosure can be used with various metal processing lines, such as compact Continuous Annealing Solution Heat treat (CASH) lines. Certain aspects and features of the present disclosure can be used for various purposes, such as for homogenizing or annealing a metal article. The heating apparatuses disclosed herein are described in a horizontal orientation, although they may be equally used in any suitable orientation, such as vertical, angled, or curved. The heating apparatuses disclosed herein can be operated at any suitable temperature, although it may be desirable to operate at temperatures of approximately 560° C., 565° C., 570° C., 575° C., 580° C., 585° C., 590° C., 595° C., or 600° C. or lower when treating aluminum alloys, and even more desirably at approximately 565° C.

In some cases, certain aspects and features of the present disclosure can be especially useful for treating a metal article immediately or soon after exiting a continuous casting device. A metal article, such as a metal slab (e.g., a slab at approximately 16 mm thickness) or metal strip, can enter the heating apparatus at approximately 450° C., after exiting a continuous casting device and optionally being quenched, and can be heated to a temperature of approximately 560° C. to approximately 570° C. After the post-casting heating process, the metal article can undergo a thickness reduction, such as by hot rolling. In some cases, the thickness reduction can be approximately 70% reduction in thickness, although greater or smaller reductions in thickness can be used.

In this description, reference is made to alloys identified by AA numbers and other related designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, a plate generally has a thickness in a range of 5 mm to 50 mm. For example, a plate may refer to an aluminum product having a thickness of about 5 mm, 10 mm, 15 mm, 20 mm, 25 mm, 30 mm, 35 mm, 40 mm, 45 mm, or 50 mm.

As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm.

As used herein, a sheet generally refers to an aluminum product having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Unless stated otherwise, the expression "up to" when referring to the compositional amount of an element means that element is optional and includes a zero percent composition of that particular element. Unless stated otherwise, all compositional percentages are in weight percent (wt. %).

As used herein, the meaning of "a," "an," and "the" includes singular and plural references unless the context clearly dictates otherwise.

In the following examples, the aluminum alloy products and their components are described in terms of their elemental composition in weight percent (wt. %). In each alloy, the remainder is aluminum, with a maximum wt. % of 0.15% for the sum of all impurities.

Incidental elements, such as grain refiners and deoxidizers, or other additives may be present in the invention and may add other characteristics on their own without departing from or significantly altering the alloy described herein or the characteristics of the alloy described herein.

Unavoidable impurities, including materials or elements may be present in the alloy in minor amounts due to inherent properties of aluminum or leaching from contact with processing equipment. Some impurities typically found in aluminum include iron and silicon. The alloy, as described, may contain no more than about 0.25 wt. % of any element besides the alloying elements, incidental elements, and unavoidable impurities.

The alloys described herein can be cast using any suitable casting method known to those of ordinary skill in the art. As a few non-limiting examples, the casting process can include a Direct Chill (DC) casting process or a Continuous Casting (CC) process. The continuous casting system can include a pair of moving opposed casting surfaces (e.g., moving opposed belts, rolls or blocks), a casting cavity between the pair of moving opposed casting surfaces, and a molten metal injector. The molten metal injector can have an end opening from which molten metal can exit the molten metal injector and be injected into the casting cavity. In some cases, aspects of the present disclosure may be especially suitable for use with a continuous cast metal article.

The aluminum alloy products described herein can be used in automotive applications and other transportation applications, including aircraft and railway applications. For example, the disclosed aluminum alloy products can be used to prepare automotive structural parts, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The aluminum alloy products and methods described herein can also be used in aircraft or railway vehicle applications, to prepare, for example, external and internal panels. Certain aspects and features of the present disclosure can provide metal articles with improved surface qualities and metallurgy, which can result in improved bonding capability and formability, which may be especially desirable for any of the applications mentioned herein, as well as others.

The aluminum alloy products and methods described herein can also be used in electronics applications. For example, the aluminum alloy products and methods described herein can be used to prepare housings for electronic devices, including mobile phones and tablet computers. In some examples, the aluminum alloy products can be used to prepare housings for the outer casing of mobile phones (e.g., smart phones), tablet bottom chassis, and other portable electronics.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale and certain dimensions may be exaggerated for illustrative purposes.

FIG. 1 is a schematic diagram depicting a side view of a continuous, non-contact heating apparatus 100 according to certain aspects of the present disclosure. The heating apparatus 100 can include a heating zone 102 and a flotation zone 104. A metal article 110 (e.g., a metal slab or metal strip) can pass through the heating apparatus 100 in a downstream direction 112 (e.g., a processing direction). The metal article 110 can enter at an entrance 106 at an upstream end of the heating apparatus 100 and exit at an exit 108 at a downstream end of the heating apparatus 100.

The metal article 110 can pass through a heating zone 102 and a flotation zone 104 without physically contacting any supporting structures within the heating zone 102 or the flotation zone 104. In the heating zone 102, the metal article 110 can be heated to a desired setpoint temperature. In the flotation zone 104, the metal article 110 can be maintained at the desired setpoint temperature (e.g., at or within 0.5%, 0.6%, 0.7%, 0.8%, 0.9%, 1%, 2%, 3%, 4%, 5%, 6%, 7%, 8%, 9%, 10%, or 15% of a desired setpoint temperature). The length of the flotation zone 104 and the speed that the metal article 110 travels in the downstream direction 112 can dictate the duration of time (e.g., soak time) a particular cross section of the metal article 110 spends at the desired setpoint temperature. For example, a 30 meter flotation zone 104 can provide 3 minutes of soak time for a metal slab traveling at 10 meters per minute.

In some cases, prior to entering the heating zone 102, the metal article 110 can be cooled to facilitate providing an even (e.g., homogenous) temperature profile across the lateral width of the metal article 110. However, cooling need not occur prior to entering the heating zone 102.

The heating zone 102 can contain any suitable heating devices. As depicted in FIG. 1, the heating zone 102 includes an array of rotating magnets 114 configured to heat the metal article 110. Optionally, an induction loop 118 can surround the metal article 110 within the heating zone 102 to provide supplemental heat to the metal article 110. In some cases, the heating zone 102 includes the induction loop 118 and does not include the array of rotating magnets 114 for heating. In such cases, the heating zone 102 may include additional rotating magnets for levitation purposes, as described in further detail with respect to flotation zone 104. In some cases, one or more induction loops 118 can provide supplemental heating to improve lateral temperature homogeneity in the metal strip, such as to correct any cold spots formed during magnetic heating.

The flotation zone 104 can include an array of rotating magnets 116 configured to levitate the metal article 110. The array of rotating magnets 116 for levitation can be located solely within the flotation zone 104, or may optionally also be located within the heating zone 102. In some cases, optional coolant nozzles 122 can be located within the flotation zone 104 to provide additional temperature control to maintain the metal article 110 at the desired setpoint temperature, despite any heat added from the array of rotating magnets 116. Each of the coolant nozzles 122 may have individual controls (e.g., valves) to control application of coolant to the metal article 110.

In some cases, a flotation zone 104 can include traditional flotation elements, such as air nozzles or other elements for levitating a metal strip using non-magnetic techniques. These elements can be used instead of or in addition to magnetic levitation.

An array of rotating magnets configured to heat the metal article 110 can include magnets sized and positioned to efficiently raise the temperature of the metal article 110, such as magnetic rotors extending across approximately the full width of the metal article 110 or more. An array of rotating magnets configured to levitate the metal article 110 can include magnets sized and positioned to efficiently levitate the metal article 110 without providing substantial heat to the metal article 110, such as magnetic rotors containing one or more rotating magnets occupying less than the full width of the metal article 110 (e.g., at or less than approximately 95%, 90%, 85%, 80%, 75%, 70%, 65%, 60%, 55%, 50%, 45%, 40%, 35%, 30%, 25%, 20%, 15%, or 10% of the lateral width of the metal article 110).

One or more sensors 124 can be placed within the heating apparatus 100, such as within the heating zone 102 and/or flotation zone 104 to measure characteristics of the metal article 110, such as a temperature of the metal article 110, or characteristics of the atmosphere within the heating apparatus 100. Measurements from the sensors 124 can be provided to a controller 126. In some cases, the controller 126 can use measurements from the sensors 124 to provide dynamic control to aspects of the heating apparatus 100, such as the array of rotating magnets 114 or the induction loop 118 in the heating zone 102, and/or the coolant nozzles 122 in the flotation zone 104. The controller 126 can use the feedback form the sensors 124 to ensure the desired setpoint temperature is achieved in the heating zone 102 and maintained in the flotation zone 104.

In some cases, the heating apparatus 100 can include an optional chamber 120 containing an inert atmosphere. Gas ports 128 can supply inert gas or minimally reactive gas to the chamber 120 from a gas supply, thus maintaining an inert atmosphere surrounding the metal article 110. The chamber 120 can extend from the entrance 106 to the exit 108. The chamber 120 can be made of any suitable material, such as an electrically non-conductive and/or thermally insulating material. In some cases, the chamber 120 can be made from Kevlar® or similar materials.

Figure 2:
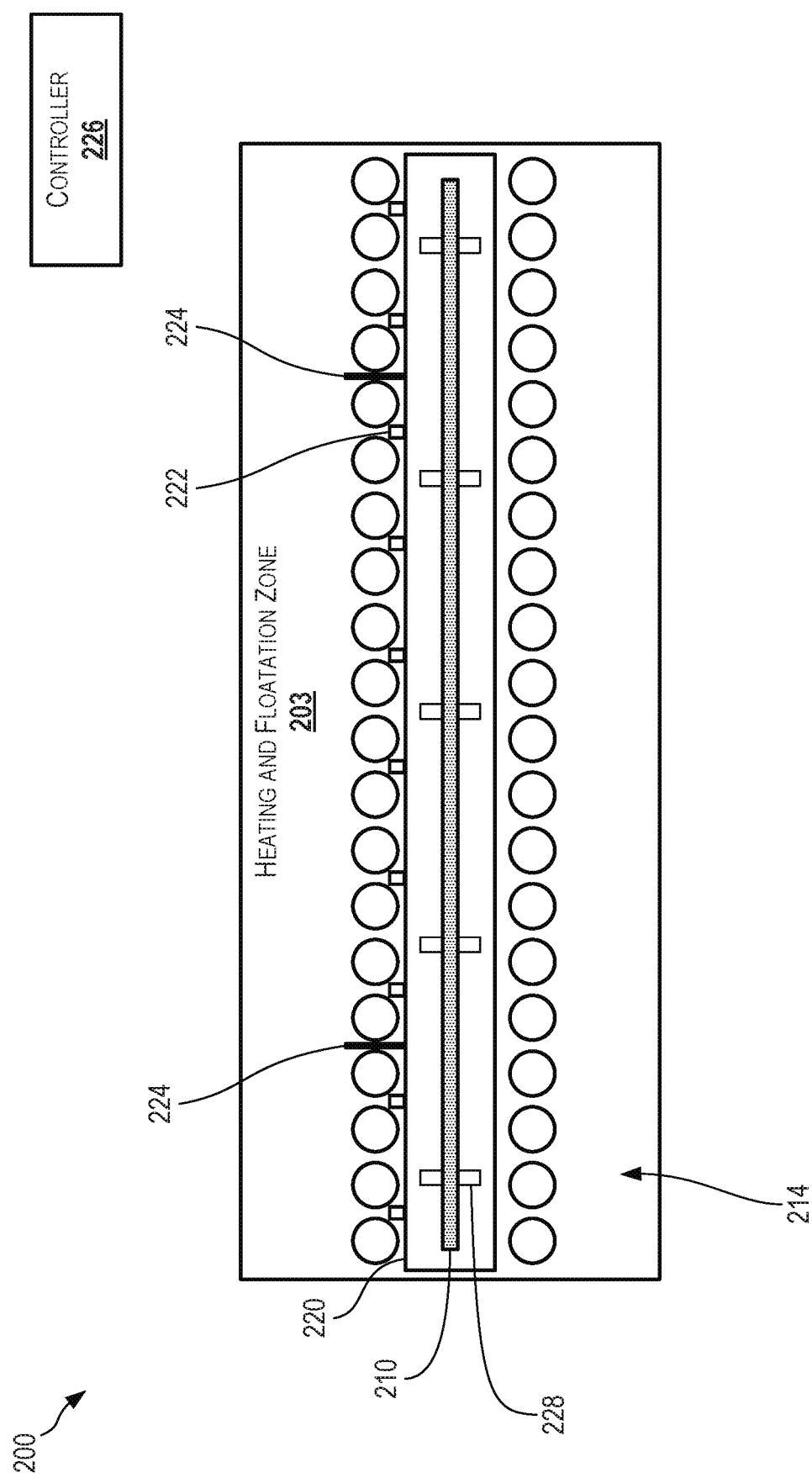
FIG. 2 is a schematic diagram depicting a side view of a non-continuous, non-contact heating apparatus according to certain aspects of the present disclosure.

FIG. 2 is a schematic diagram depicting a side view of a non-continuous, non-contact heating apparatus 200 according to certain aspects of the present disclosure. The heating apparatus 200 can include a combined heating and flotation zone 203. A metal article 210 (e.g., a metal slab or metal strip) can be positioned within the heating apparatus 200.

The heating and flotation zone 203 can have an opening into which the metal article 210 can be inserted and retrieved, or can move between an open and closed position to allow the metal article 210 to be placed within the heating apparatus 200, heated and soaked, and then removed therefrom. The non-continuous, non-contact heating apparatus 200 can allow for batch processing of metal articles 210 in a non-continuous fashion.

Within the heating and flotation zone 203, the metal article 210 can be levitated and heated without physically contacting any supporting structures within the heating and flotation zone 203. In some cases, the metal article 210 can be supported only at its ends and can be levitated using rotating magnets. In the heating and flotation zone 203, the metal article 210 can be heated to a desired setpoint temperature and maintained at the desired setpoint temperature (e.g., at or within 0.5%, 0.6%, 0.7%, 0.8%, 0.9%, 2%, 2%, 3%, 4%, 5%, 6%, 7%, 8%, 9%, 20%, or 25% of a desired setpoint temperature) for a desired duration of time (e.g., soak time).

The heating and flotation zone 202 can contain any suitable heating devices, such as rotating magnets and/or induction coils. As depicted in FIG. 2, the heating and flotation zone 203 includes an array of rotating magnets 214 configured to heat the metal article 210 and levitate the metal article 210 within the heating and flotation zone 203. In some cases, an additional array of rotating magnets configured to levitate the metal article 210 can be positioned within the heating and flotation zone 203. An array of rotating magnets configured to heat the metal article 210 can include magnets sized and positioned to efficiently raise the temperature of the metal article 210, such as magnetic rotors extending across approximately the full width of the metal article 210 or more. An array of rotating magnets configured to levitate the metal article 210 can include magnets sized and positioned to efficiently levitate the metal article 210 without providing substantial heat to the metal article 210, such as magnetic rotors containing one or more rotating magnets occupying less than the full width of the metal article 210 (e.g., at or less than approximately 95%, 90%, 85%, 80%, 75%, 70%, 65%, 60%, 55%, 50%, 45%, 40%, 35%, 30%, 25%, 20%, 15%, or 10% of the lateral width of the metal article 210).

In some cases, optional coolant nozzles 222 can be located within the heating and flotation zone 203 to provide additional temperature control to maintain the metal article 210 at the desired setpoint temperature. Each of the coolant nozzles 222 may have individual controls (e.g., valves) to control application of coolant to the metal article 210.

One or more sensors 224 can be placed within the heating and flotation zone 203 to measure characteristics of the metal article 210, such as a temperature of the metal article 210, and/or characteristics of the atmosphere within the heating apparatus 200. Measurements from the sensors 224 can be provided to a controller 226. In some cases, the controller 226 can use measurements from the sensors 224 to provide dynamic control to aspects of the heating apparatus 200, such as the array of rotating magnets 214 or other heating device, or the coolant nozzles 222. The controller 226 can use the feedback form the sensors 224 to ensure the desired setpoint temperature is achieved and maintained during a heating process.

In some cases, the heating apparatus 200 can include an optional chamber 220 containing an inert atmosphere. Gas ports 228 can supply inert gas or minimally reactive gas to the chamber 220 from a gas supply, thus maintaining an inert atmosphere surrounding the metal article 210. The chamber 220 can be made of any suitable material, such as an electrically non-conductive and/or thermally insulating material. In some cases, the chamber 220 can be made from Kevlar® or similar materials.

Figure 3:
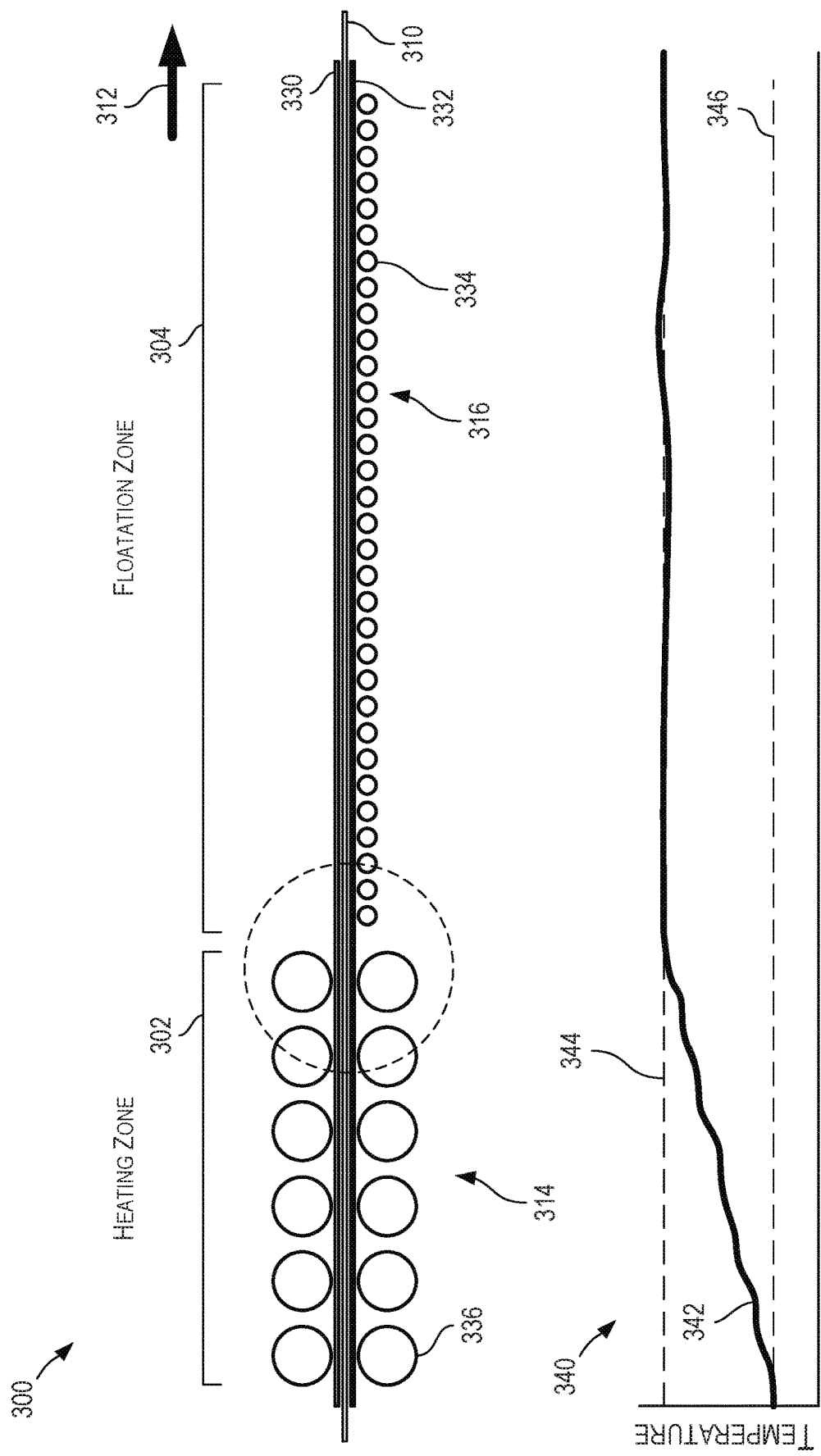
FIG. 3 is a combination schematic diagram and temperature chart depicting a continuous heating apparatus using rotating magnets according to certain aspects of the present disclosure.

FIG. 3 is a combination schematic diagram and temperature chart 340 depicting a continuous heating apparatus 300 using rotating magnets according to certain aspects of the present disclosure. The temperature chart 340 is aligned with the heating apparatus 300 to display an approximate temperature 342 of the metal article 310 at different distances along the heating apparatus 300. The dotted circle is an indicator for a close-up view depicted in FIG. 4. The heating apparatus 300 of FIG. 3 can be the heating apparatus 100 of FIG. 1. A metal article 310, such as a metal strip or metal slab, can travel through the heating apparatus 300 in a downstream direction 312.

The heating apparatus 300 includes a heating zone 302 and a flotation zone 304. In the heating zone 302, an array of rotating magnets 314 can heat the metal article 310 to raise a temperature of the metal article 310. The array of rotating magnets 314 includes six pairs of magnetic rotors 336 longitudinally spaced apart from one another, with each pair of magnetic rotors 336 including opposing top and bottom rotors on opposite sides of the metal article 310. In some cases, the array of rotating magnets 314 can include other numbers of rotating magnets (e.g., other numbers of rotors) in other configurations and/or orientations. The temperature chart 340 shows that the temperature 342 of the metal article 310 increases as the metal article 310 passes each of the pairs of magnetic rotors 336. The temperature 342 of the metal article 310 increases from an entrance temperature 346 to a desired setpoint temperature 344 within the heating zone 302.

In the flotation zone, 304, an array of rotating magnets 316 levitates the metal article 310, allowing the metal article 310 to soak at the desired setpoint temperature 344 for a desired duration. Optional coolant dispensers (such as coolant nozzles 122 of FIG. 1) can be used to help maintain the temperature 342 at the desired setpoint temperature 344, despite any heating effects from the array of rotating magnets 316. The array of rotating magnets 316 can include several rotors 334, such as 31 rotors 334. Each rotor 334 can include one or more laterally spaced apart rotating magnets occupying less than the full width of the metal article 310 (e.g., at or less than approximately 95%, 90%, 85%, 80%, 75%, 70%, 65%, 60%, 55%, 50%, 45%, 40%, 35%, 30%, 25%, 20%, 15%, or 10% of the lateral width of the metal article 310).

A chamber for containing an inert atmosphere can be defined in part by a top wall 330 and a bottom wall 332, as well as side walls (not shown). Each of the top wall 330 and bottom wall 332, as well as optionally the side walls, can be made of an electrically non-conductive and thermally insulating material. In some cases, a portion or the entirety of one or both of the top wall 330, the bottom wall 332 and the side walls can be made of a conductive and/or magnetic material or can have a conductive and/or magnetic material coupled thereto. This conductive and/or magnetic material can help divert magnetic flux (e.g., as a flux director) from one or more magnetic rotors, such as the magnetic rotors 336 of the heating zone 302, in a desired fashion. If no walls are present, magnetic flux can be diverted from one or more magnetic rotors, such as the magnetic rotors 336 of the heating zone 302, in another fashion.

The metal article 310 can pass between the top wall 330 and the bottom wall 332 as it travels through the heating apparatus 300. The rotors 336 of the array of rotating magnets 314 in the heating zone 302 and the rotors 334 of the array of rotating magnets 316 in the flotation zone 304 can be positioned outside of the chamber, opposite the top wall 330 and/or bottom wall 332 form the metal article 310.

Figure 4:
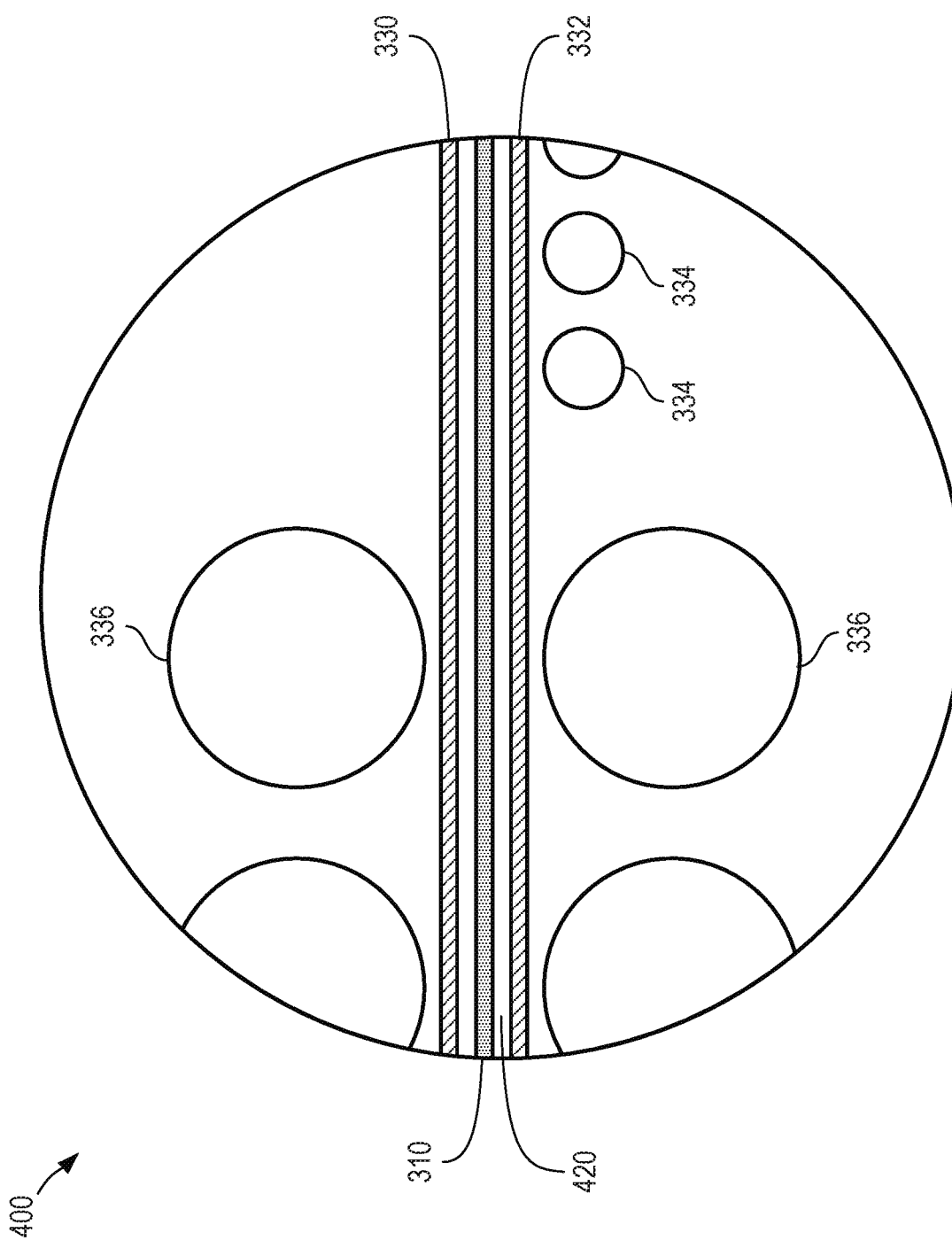
FIG. 4 is a close-up schematic side view diagram depicting a portion of the heating apparatus of FIG. 3 according to certain aspects of the present disclosure.

FIG. 4 is a close-up schematic side view diagram depicting a portion 400 of the heating apparatus 300 of FIG. 3 according to certain aspects of the present disclosure. The portion 400 of FIG. 4 is identified by a dotted circle in FIG. 3. The rotors 336 of the heating zone are positioned above and below the metal article 310 and positioned outside of the chamber 420 formed by the top wall 330 and the bottom wall 332. The rotors 334 of the flotation zone are positioned solely below the metal article 310 and positioned outside of the chamber 420, below the bottom wall 332.

Figure 5:
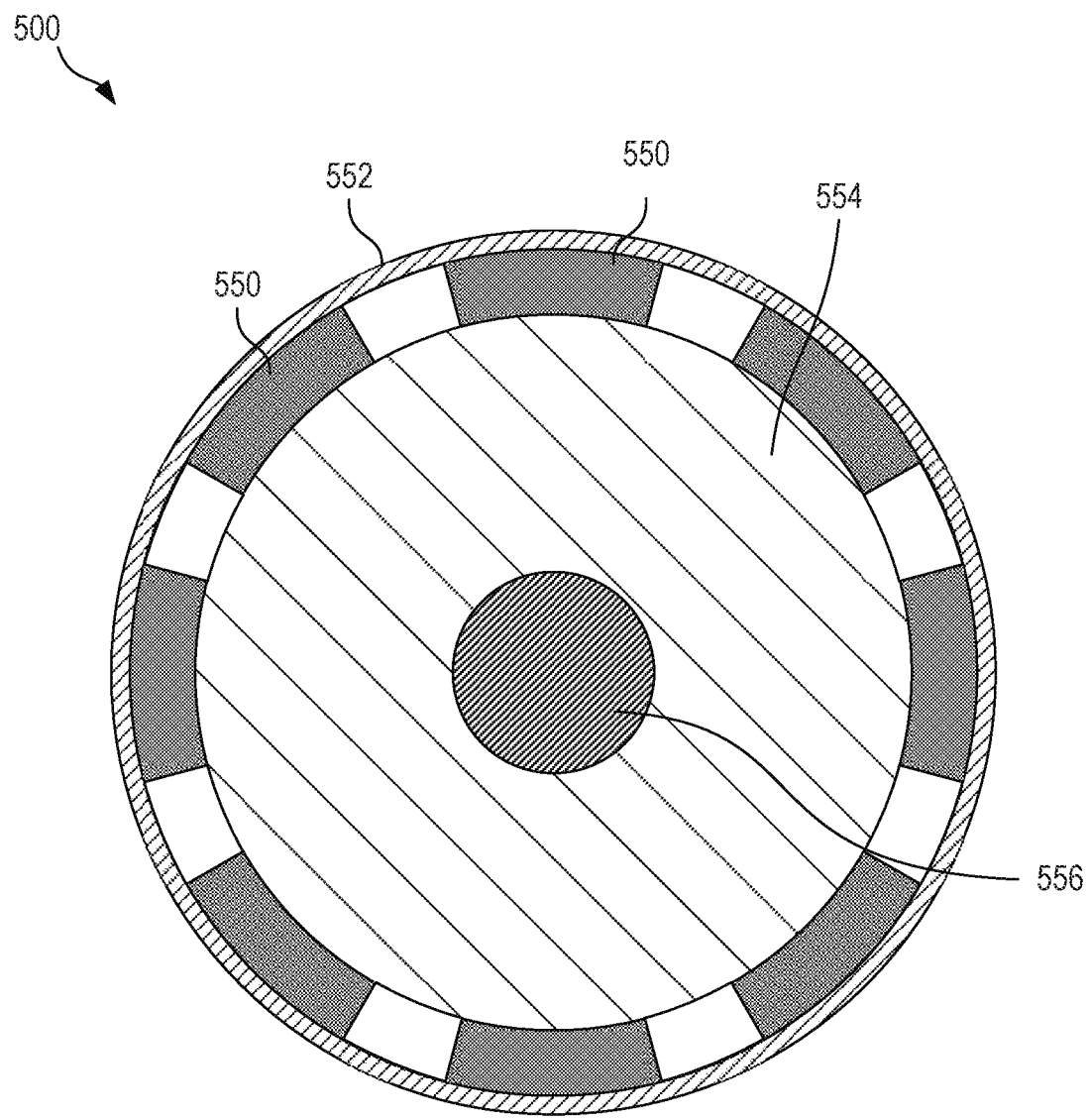
FIG. 5 is a cutaway side view of a permanent magnetic rotor according to certain aspects of the present disclosure.

FIG. 5 is a cutaway side view of a permanent magnetic rotor 500 according to certain aspects of the present disclosure. The permanent magnetic rotor 500 is an example of a rotor suitable to be a rotor of any of the arrays of rotating magnets 114, 116 of FIG. 1 or array of rotating magnets 214 of FIG. 2. The magnetic rotor 500 can include one or more magnetic sources 550. As seen in FIG. 5, the magnetic rotor 500 includes eight magnetic sources 550 that are permanent magnets. The magnets can be arranged in any suitable orientation. Magnetic sources 550 can be arranged such that adjacent permanent magnets provide different poles facing radially outwards (e.g., alternating N, S, N, S, N, S, N, S). Any suitable permanent magnet can be used, such as samarium cobalt, neodymium, or other magnets. In some cases, samarium cobalt magnets may be desirable over neodymium magnets, as samarium cobalt magnets may drop in magnetic field strength slower with higher heats. However, in some cases, neodymium magnets may be desirable over samarium cobalt magnets, as neodymium magnets have stronger field strengths at cooler temperatures.

The magnetic sources 550 can be enclosed by a shell 552. The shell 552 can be any suitable material capable of allowing magnetic flux to pass therethrough. In some cases, the shell 552 can be made of or can further include a non-metallic coating. In some cases, the shell 552 can include a Kevlar® coating.

In some cases, the magnetic rotor 500 can include a ferromagnetic core 554 having a central axle 556. The magnetic rotor 500 can include other internal arrangements suitable for supporting the magnetic sources 550. Any suitable number of magnetic sources 550 can be used, however it has been found that efficient results can be achieved with an even number of magnetic sources 550, such as six or eight magnetic sources 550.

The magnetic sources 550 can be sized to cover any percentage of the circumference of the magnetic rotor 500. Efficient results can be achieved with magnetic sources 550 sized to occupy approximately 40%-95%, 50%-90%, or 70%-80% of the circumference of the magnetic rotor 500.

The magnetic rotor 500 can be formed in any suitable size, however it has been found that efficient results can be achieved with a rotor having a diameter between 200 mm and 600 mm, at least 300 mm, at least 400 mm, at least 500 mm, or at least 600 mm.

The thickness of each magnetic source 550 can be any suitable thickness capable of fitting within the magnetic rotor 500, however it has been found that efficient results can be achieved with permanent magnet thicknesses of at or at least 15 mm, 15-100 mm 15-40 mm, 20-40 mm, 25-35 mm, 30 mm, or 50 mm. Other thicknesses can be used.

Through trial and experimentation, it has been determined that highly efficient heating power can be obtained with the use of six or eight magnets positioned around a single rotor, although other numbers of magnets can be used. When too many magnets are used, the heating power can drop off. In some cases, the number of magnets can be selected to minimize installation and/or maintenance cost (e.g., the number of magnets to purchase). In some cases, the number of magnets can be selected to minimize the tension fluctuations that occur in the metal strip due to the movement of the magnets adjacent the metal strip. For example, very few magnets may cause larger and/or longer tension fluctuations, whereas more magnets may cause smaller and/or shorter fluctuations. Through trial and experimentation, it has been determined that highly efficient heating power can be obtained when the magnets occupy 40% to 95% of the circumference of the rotor, or more specifically 50%-90% or 70%-80% of the circumference of the rotor. Through trial and experimentation, it has been determined that highly efficient heating power can be obtained when the diameter of the rotor is large, such as at or greater than 200, 300, 400, 500, or 600 mm. Additionally, the use of larger rotors can help minimize magnet costs. Through trial and experimentation, it has been determined that highly efficient heating power can be obtained when the diameter of the rotor is large, such as at or greater than 200, 300, 400, 500, or 600 mm. Additionally, the use of larger rotors can help minimize magnet costs. In some cases, smaller rotors (e.g., at or below 600, 500, 400, 300, or 200 mm in diameter) can be especially suitable for levitating the metal article, whereas the larger rotors can be especially suitable for heating the metal article.

As the speed of the rotor increases, the heating power tends to increase. However, in some cases, if the speed of the rotor reaches a threshold level, further increases in speed will negatively impact the heating efficiency due to the inherent inductance and resistivity characteristics of the metal strip. It has been determined that at or approximately 1800 revolutions per minute (e.g., within 1%, 2%, 3%, 4%, 5%, 6%, 7%, 8%, 9%, 10%, 15%, or 20% of 1800 revolutions per minute) can be a desirable speed in part due to the simplicity in controlling rotor motors at the 60 Hz frequency found in mains power in various locales. In some cases, other frequencies can be selected based on the rotor motor used and/or the mains power supplied. It has been determined that while rotor speed can be a useful method for controlling the amount of heat energy applied to the metal strip, it can be advantageous to maintain a constant rotor speed and use vertical gap control and other controls to adjust the amount of heat energy applied to the metal strip.

Through trial and experimentation, it has been determined that highly efficient heating power can be obtained when the thicknesses of the permanent magnets in the rotor are between 15-40 mm, 20-40 mm, or 25-35 mm, or at or approximately at 30 mm. While strong heating power can be obtained with thicker magnets, the use of magnets within the above ranges can provide sufficiently strong heating power while simultaneously keeping the installation/maintenance costs of the magnets down.

Figure 6:
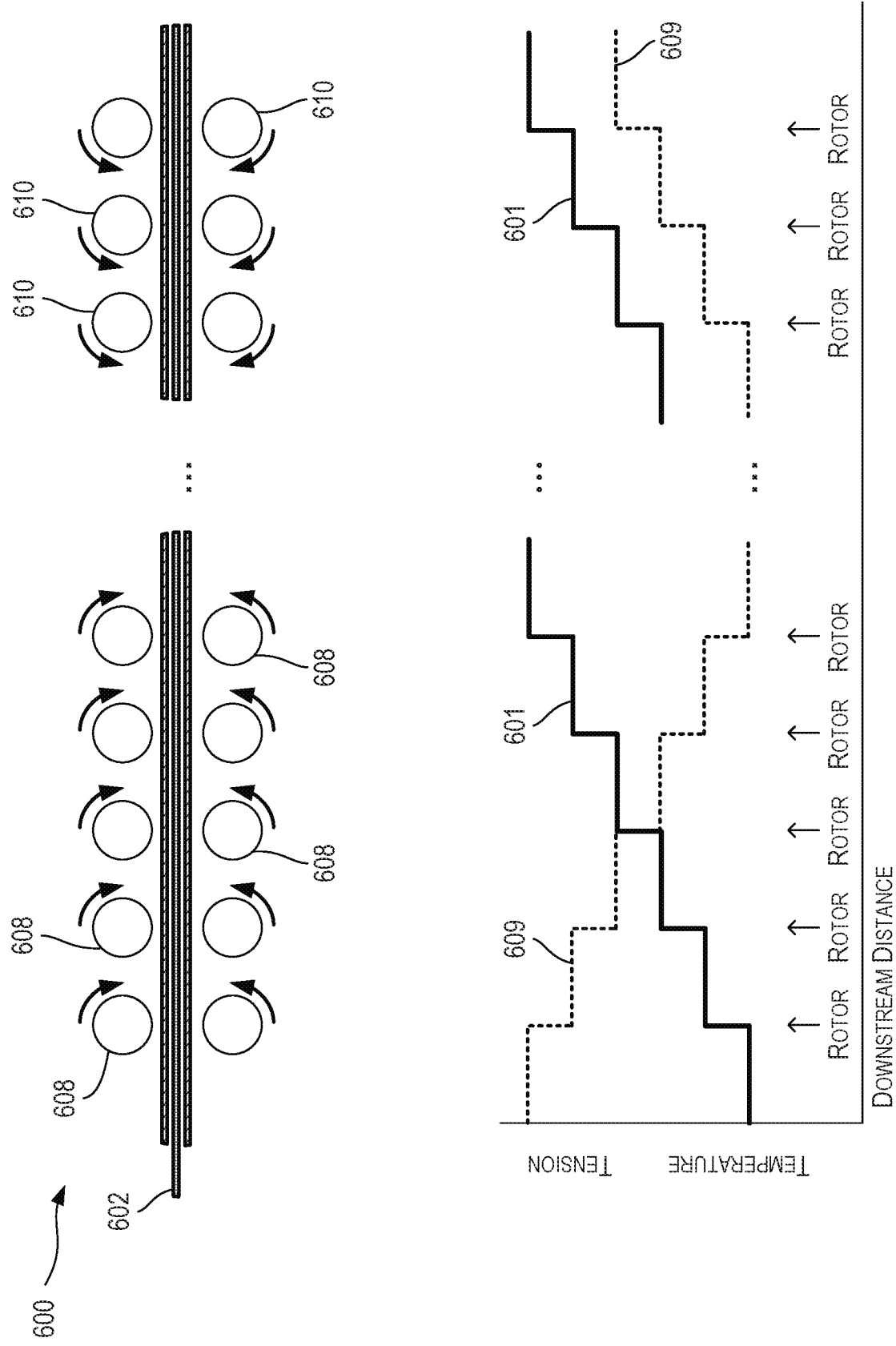
FIG. 6 is a combination schematic diagram and graph depicting an array of rotating magnets for magnetic heating and tension control according to certain aspects of the present disclosure.

FIG. 6 is a combination schematic diagram and graph depicting an array of rotating magnets 600 for magnetic heating and tension control according to certain aspects of the present disclosure. The array of rotating magnets 600 can include multiple rotors 608, 610 capable of heating the metal article 602 as well as inducing tension changes in the metal article 602. Magnetic heating and tension control as described with reference to FIG. 6 can be used with any suitable rotors, including rotors for heating and rotors for levitation. Magnetic heating may occur in the heating zone of a heating apparatus, such as heating apparatus 100 of FIG. 1, and tension control may occur anywhere within the heating apparatus.

The left portion of FIG. 6 depicts rotors 608 positioned immediately on opposite sides of a metal article 602. As the metal article 602 enters the gap between the first pair of rotors 608, the tension may initially be relatively high, as seen in the tension line 609 of FIG. 6. By rotating each of the rotors 608 in an upstream direction, the rotors 608 can impart tension adjustments while simultaneously increasing the temperature of the metal article 602, as seen in the temperature line 601 of FIG. 6. Each successive rotor 608 operated in the upstream direction can decrease the tension of the metal strip while increasing the temperature of the metal strip. This technique can be especially beneficial because as the temperature of the metal article 602 increases, excessive tension and/or physical contact can be undesirable and can cause defects in the metal article 602. The use of a magnetic rotor 608 to increase the temperature and decrease the tension in the metal article 602 can be accomplished without making physical contact between the metal article 602 and the rotor 608.

The right portion of FIG. 6 depicts rotors 610 operating to increase tension while simultaneously providing heating. As the metal article 602 passes through the gaps of rotors 610, the tension may initially be relatively low and may be increased. Therefore, a magnetic rotor 610 as described herein can be especially useful for both increasing temperature of the metal article 602 and increasing tension in the metal article 602 without needing to contact the metal article 602. By rotating the magnetic rotors 610 in a downstream direction, the rotors 610 can increase the tension in the metal article 602 while simultaneously increasing the temperature of the metal article 602.

When levitating rotors are used instead of heating rotors, the levitating rotors may increase or decrease tension without providing significant heating to the metal article.

Figure 7:
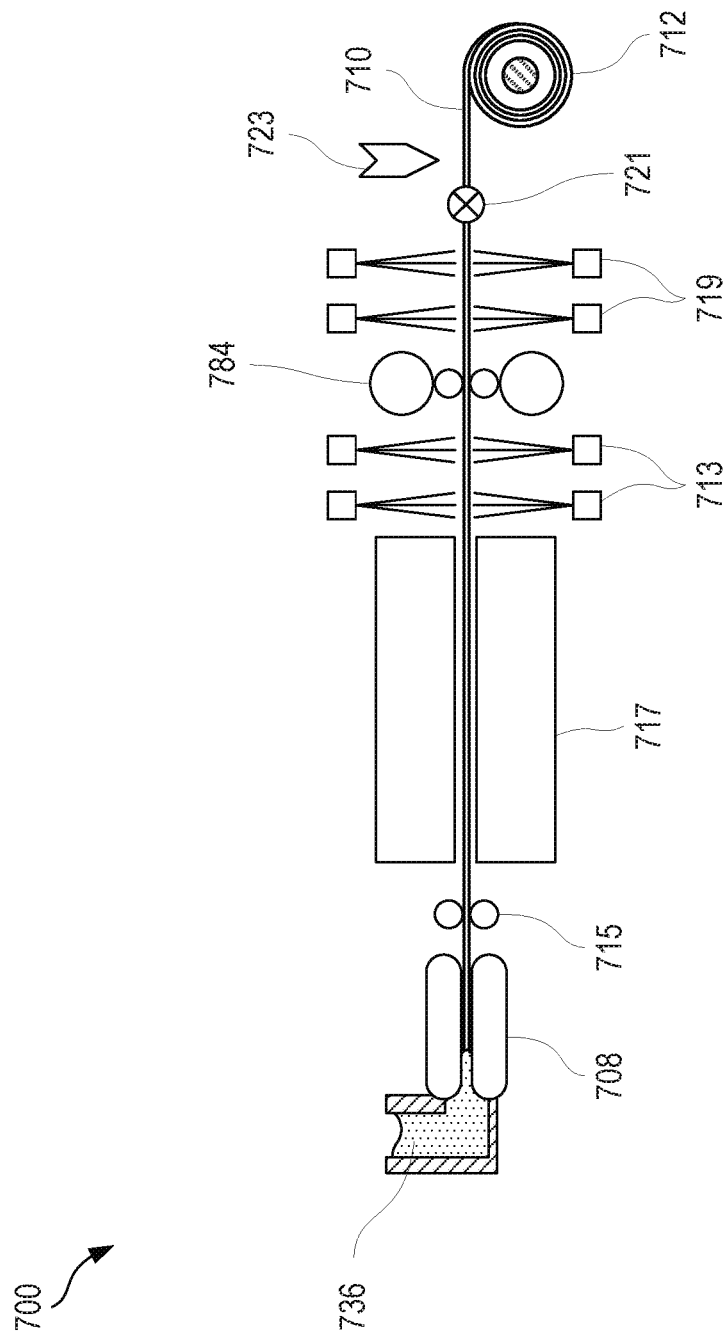
FIG. 7 is a schematic diagram depicting a partially decoupled continuous casting system using a heating apparatus according to certain aspects of the present disclosure.

FIG. 7 is a schematic diagram depicting a partially decoupled continuous casting system 700 using a heating apparatus 717 according to certain aspects of the present disclosure. A heating apparatus 717, such as heating apparatus 100 of FIG. 1, can be especially useful in a fully or partially decoupled continuous casting system.

The partially decoupled continuous casting system 700 includes a continuous casting device, such as a continuous twin belt caster 708, although other continuous casting devices can be used, such as twin roll casters. The continuous belt caster 708 includes opposing belts capable of extracting heat from liquid metal 736 at a cooling rate sufficient to solidify the liquid metal 736, which once solid passes out of the continuous belt caster 708 as a metal article 710. The thickness of the metal article 710 as it exits the continuous belt caster 708 can be approximately 16 mm, although other thicknesses can be used. The continuous belt caster 708 can operate at a desired casting speed. The opposing belts can be made of any suitable material, however in some cases the belts are made from copper or aluminum. Cooling systems within the continuous belt caster 708 can extract sufficient heat from the liquid metal 736 such that the metal article 710 exiting the continuous belt caster 708 has a temperature between 200° C. to 530° C., although other ranges can be used.

In some cases, a heating apparatus 717 (e.g., heating apparatus 100 of FIG. 1) can be positioned downstream of the continuous belt caster 708 near the exit of the continuous belt caster 708. In some cases, an optional pinch roll 715 can be positioned between the continuous belt caster 708 and the heating apparatus 717. The heating apparatus 717 can increase the temperature of the metal article 710 to a desired setpoint temperature, which can be approximately 570° C. (e.g., 500-570° C., 520-560° C., or at or approximately 560° C. or 570° C.), and maintain that temperature for a desired amount of time. The heating apparatus 717 can be of sufficient length to allow the metal article 710 to pass through the heating apparatus 717 in at or approximately 1 minutes to 10 minutes, or more preferably at or between 1 minutes and 7 minutes, while moving at the exit speed of the continuous caster 708.

In some cases, a hot rolling stand 784 can be optionally positioned downstream of the heating apparatus 717 and upstream of a coiling apparatus. The hot rolling stand 784 can reduce the thickness of the metal article 710 by at least 70%, or more preferably between 50% and 75%. In some cases, a roughing mill can be used in place of a hot rolling stand 784. A post-rolling quench 719 can reduce the temperature of the metal article 710 after it exits the hot rolling stand 784. The post-rolling quench 719 can impart beneficial metallurgical characteristics. In some cases, an optional pre-rolling quench 713 can reduce the temperature of the metal article 710 between the heating apparatus 717 and the hot rolling stand 784, which can impart beneficial metallurgical characteristics on the metal article 710. The pre-rolling quench 713 and/or post-rolling quench 719 can reduce the temperature of the metal article 710 at a rate of at or approximately 200° C./sec. Before coiling, the metal article 710 can undergo edge trimming by an edge trimmer 721. During coiling, the metal article 710 can be wound into an intermediate coil 712 (e.g., a hot band) and a shear 723 can split the metal article 710 when the intermediate coil 712 has reached a desired length or size. This intermediate coil 712 can later be further processed in a rolling mill at a speed most desirable for the rolling mill. Therefore, the speed of the rolling mill and the speed of the continuous caster can be decoupled and need not be limited by one another.

In other cases, however, the metal article 710 can be further processed without being first coiled into an intermediate coil 712.

FIGS. 8-11 are side view schematic diagrams depicting a loading or threading procedure.

FIG. 8 is a schematic diagram depicting a heating apparatus 800 in an open configuration prior to threading a metal article according to certain aspects of the present disclosure. The heating apparatus 800 can be similar to heating apparatus 300 of FIG. 3. The heating apparatus 800 can include an array of rotating magnets 814 in a heating zone and an array of rotating magnets 816 in a flotation zone. When in the open position, a top wall 830 of the chamber for the inert atmosphere can be raised away from the bottom wall 832. The top rotors 836 of the array of rotating magnets 814 can be raised along with the top wall 830. In some cases, instead of raising the top wall 830 and rotors 836, the top wall 830 and rotors 836 can be otherwise moved away from the bottom wall 832. Threading of the metal article can begin by inserting the metal article from the upstream end of the heating apparatus 800 while rotating the rotating magnets of the arrays of rotating magnets 814, 816 to thread the metal article while levitating the metal article.

FIG. 9 is a schematic diagram depicting a heating apparatus 900 in an open configuration while a metal article 910 is being threaded into the heating apparatus 900 according to certain aspects of the present disclosure. The heating apparatus 900 can be heating apparatus 800 of FIG. 8 while a metal article 810 is being threaded. Threading of the metal article 910 occurs as the metal article 910 is inserted from the upstream end of the heating apparatus 900 while the rotating magnets of the arrays of rotating magnets 914, 916 are rotated, thus threading the metal article 910 while levitating the metal article 910.

Figure 10:
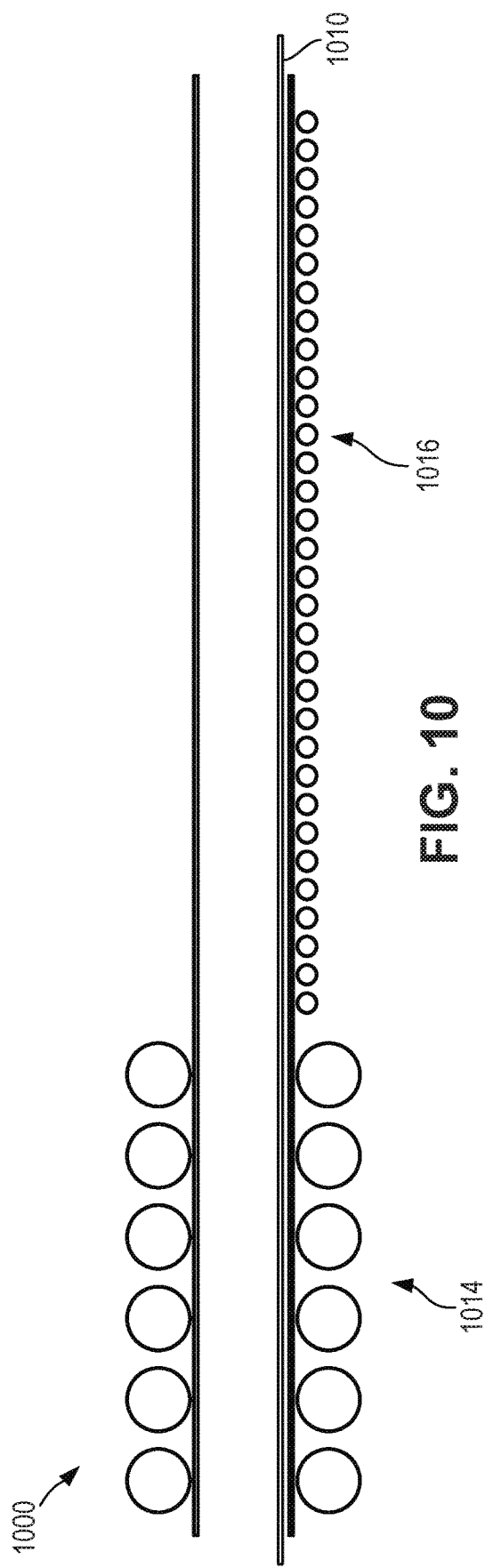
FIG. 10 is a schematic diagram depicting a heating apparatus in an open configuration after a metal article has been threaded into the heating apparatus according to certain aspects of the present disclosure.

FIG. 10 is a schematic diagram depicting a heating apparatus 1000 in an open configuration after a metal article 1010 has been threaded into the heating apparatus 1000 according to certain aspects of the present disclosure. The heating apparatus 1000 can be heating apparatus 800 of FIG. 8 when the metal article 1010 has been threaded, but before placing the heating apparatus 800 in the closed positioned. After the metal article 1010 has been fully threaded, the metal article 1010 can continue to be levitated using the arrays of rotating magnets 1014, 1016.

Figure 11:
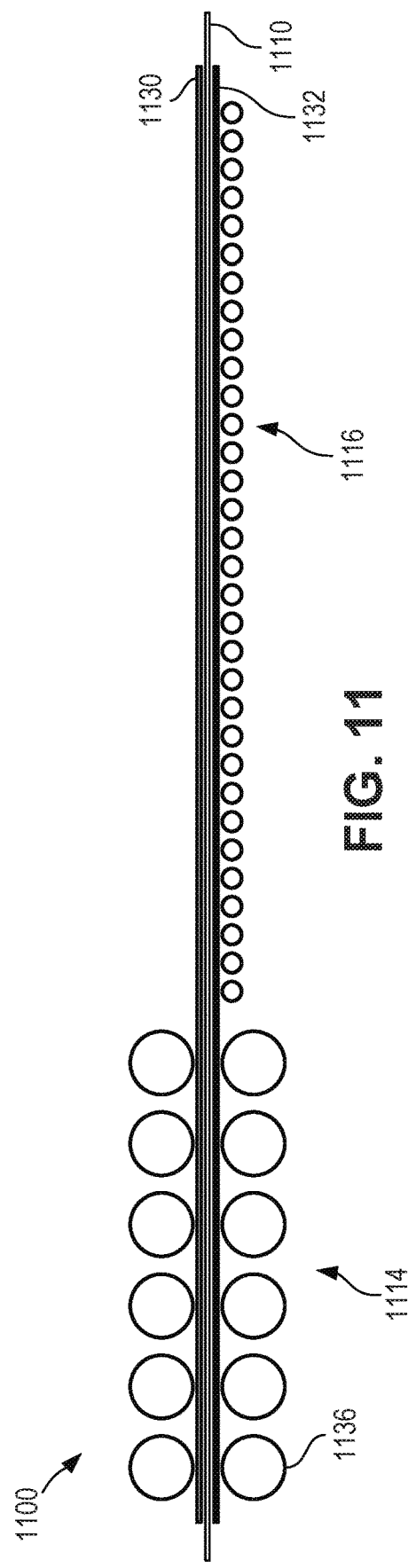
FIG. 11 is a schematic diagram depicting a heating apparatus in a closed configuration with a metal article threaded in place according to certain aspects of the present disclosure.

FIG. 11 is a schematic diagram depicting a heating apparatus 1100 in a closed configuration with a metal article 1110 threaded in place according to certain aspects of the present disclosure. The heating apparatus 1100 can be heating apparatus 800 of FIG. 8 after a metal article 1110 has been threaded and the heating apparatus 800 has been moved into a closed position. After the metal article 1110 has been threaded, such as depicted with respect to FIG. 10, the top wall 1130 of the chamber for the inert atmosphere can be moved back to its normal, operating position adjacent the bottom wall 1132 to form the chamber. The top rotors 1136 of the array of rotating magnets 1114 can be lowered or otherwise moved back into position along with the top wall 1130. Once in the closed configuration with a metal article 1110 threaded therein, the heating apparatus 1100 can operate as described herein.

Figure 12:
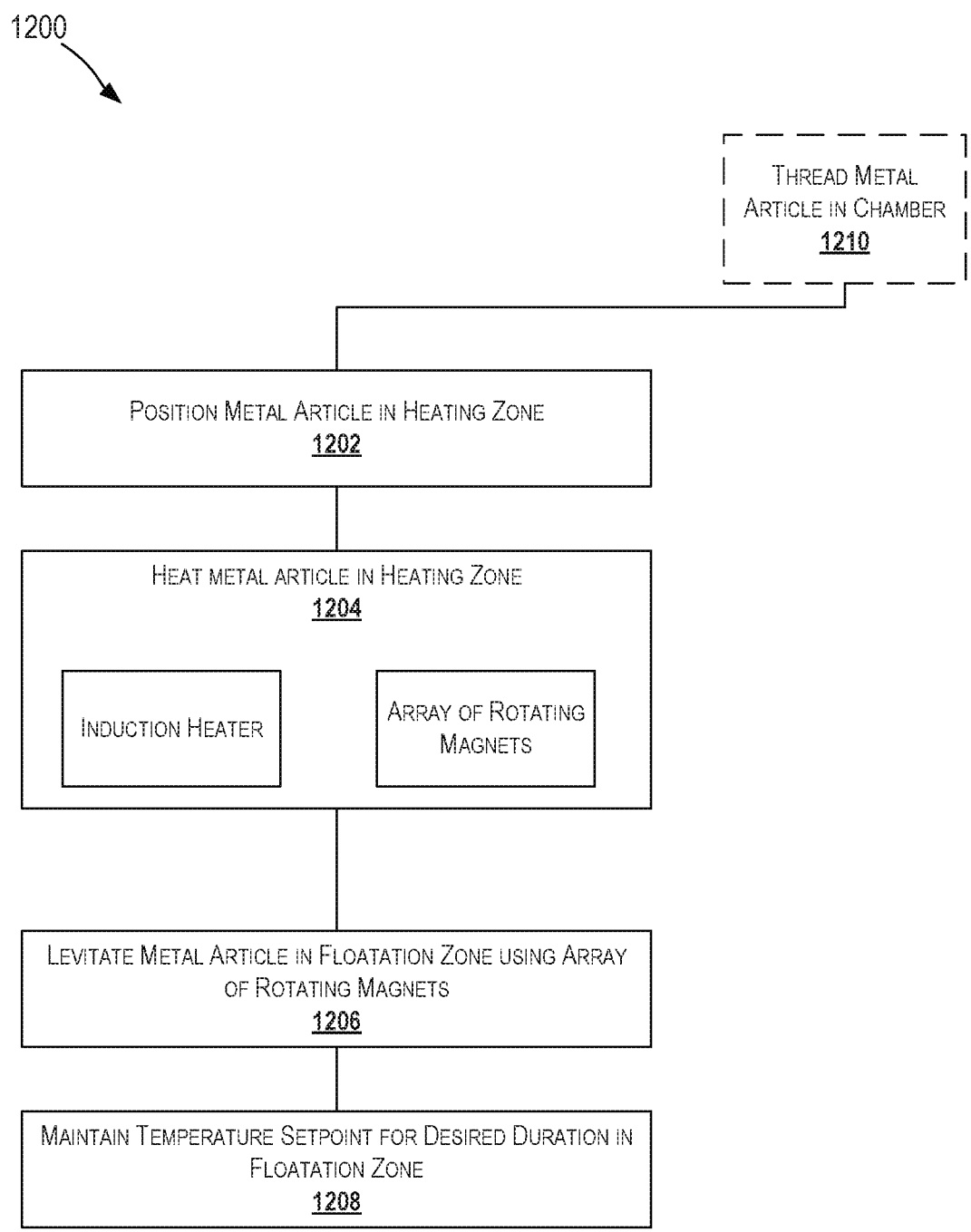
FIG. 12 is a flowchart depicting a process for heating a metal article according to certain aspects of the preset disclosure.

FIG. 12 is a flowchart depicting a process 1200 for heating a metal article according to certain aspects of the preset disclosure. Process 1200 can be carried out using the heating apparatuses described herein, such as heating apparatus 100 of FIG. 1 or heating apparatus 200 of FIG. 2.

At block 1202, a metal article can be positioned within a heating zone. In the case of a non-continuous heating apparatus, positioning the metal article in the heating zone can include inserting the metal article into a permanent or temporary opening in the heating zone. In the case of a continuous heating apparatus, positioning the metal article in the heating zone can include continuously inserting the metal article into an entrance of the heating zone.

At block 1204, the metal article can be heated in the heating zone. Heating can occur rapidly. Heating can occur based on a heating device, which may or may not be dynamically controllable through temperature sensor feedback. Examples of suitable heating devices include induction heaters and/or arrays of rotating magnets. The use of an array of rotating magnets to heat the metal article can have beneficial outcomes.

At block 1206, the metal article is levitated in a flotation zone using an array of rotating magnets. In the case of a non-continuous heating apparatus, the flotation zone can be the same as the heating zone and can thereby occupy the same space. In such cases, some or all of the array of rotating magnets used for levitation can also provide heat as the heating device of block 1204. In the case of a continuous heating apparatus, the flotation zone can be located immediately after the heating zone and the metal article can be directed into the flotation zone from the heating zone.

At block 1208, the temperature setpoint can be maintained for a desired duration in the flotation zone. In the case of a non-continuous heating apparatus, the duration can be established by time or other similar techniques. In the case of a continuous heating apparatus, the duration can be established by a combination of speed of travel of the metal article and length of the flotation zone.

In an optional block 1210, the metal article can be threaded into a chamber (e.g., a gas-filled or inert-gas-filled chamber). Threading the metal article can include separating a top wall and a bottom wall of the chamber, inserting the metal article therebetween, and re-setting the top wall and bottom wall into position to form the chamber.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

In a first example test, a 1 mm thick strip of 6xxx series aluminum was sent through an array of rotating magnets for heating, including four rotors arranged in two, longitudinally spaced pairs of opposing rotors (e.g., rotors placed above and below the metal strip). The metal strip was passed through the array of rotating magnets at a speed of 60 m/min. The strip entered the array of rotating magnets at approximately 30° C. and exited at approximately 170° C. The array of rotating magnets operated with an efficiency of approximately 75% to approximately 80% and occupied less than 1 meter of longitudinal space. By comparison, a similar heating apparatus in a standard CASH processing line would occupy greater than 5 meters and may operate at approximately 50% efficiency, if heated through induction heating. The array of rotating magnets of the first example test can be suitable for implementation as all of or part of a heating zone of a heating apparatus as described herein.

In a second example test, a 16 mm thick aluminum slab was passed through a non-contact heating apparatus at 10 m/min. The heating apparatus included a 3 or 4 meter long heating zone followed by a flotation zone of approximately 30 meters. The heating zone included six, longitudinally spaced apart pairs of opposing rotors capable of imparting an 80° C. temperature increase in the metal slab. The desired setpoint temperature was reached in the heating zone and maintained for 30 minutes in the flotation zone, all within a heating apparatus that was approximately 33 to approximately 34 meters in length. The flotation zone included 31 longitudinally spaced apart rotors positioned solely below the metal slab. Each of the rotors contained six or seven laterally spaced apart rotating magnets, with sequential rotors having rotating magnets offset from one another, forming a staggered array of rotating magnets within the flotation zone. Auxiliary cooling devices (e.g., coolant dispensers) were used in the flotation zone to maintain temperature of the metal slab within 5° C. of the setpoint temperature.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a heating apparatus, comprising: a heating zone for accepting a metal article, wherein the heating zone comprises at least one heating device for increasing a temperature of the metal article; and a flotation zone coupled to the heating zone for maintaining the temperature of the metal article, wherein the flotation zone comprises an array of flotation devices for levitating the metal article, wherein at least one of the at least one heating device and the array of flotation devices comprises an array of magnetic rotors positioned adjacent the metal article.

Example 2 is the heating apparatus of example 1, wherein each magnetic rotor of the array of magnetic rotors comprises at least one permanent magnet.

Example 3 is the heating apparatus of examples 1 or 2, wherein the heating zone and the flotation zone overlap one another.

Example 4 is the heating apparatus of example 3, wherein both of the at least one heating device and the array of flotation devices comprise the array of magnetic rotors.

Example 5 is the heating apparatus of examples 1 or 2, wherein the flotation zone is located immediately after the heating zone in a downstream direction, wherein the heating zone includes an entrance for continuously accepting the metal article, and wherein the flotation zone includes an exit for continuously outputting the metal article.

Example 6 is the heating apparatus of examples 1-3 or 5, wherein the at least one heating device comprises the array of magnetic rotors.

Example 7 is the heating apparatus of example 6, wherein the array of flotation devices comprises an additional array of magnetic rotors.

Example 8 is the heating apparatus of examples 1-4 or 5, wherein the array of flotation devices comprises the array of magnetic rotors.

Example 9 is the heating apparatus of example 8, wherein the array of magnetic rotors comprises a plurality of rotors each comprising a plurality of laterally spaced-apart magnets.

Example 10 is the heating apparatus of examples 1-9, further comprising: a temperature sensor positioned to measure a temperature of the metal article; and a controller coupled to the temperature sensor and the at least one heating device to control the at least one heating device based on a sensed temperature.

Example 11 is the heating apparatus of examples 1-10, further comprising at least one of: one or more cooling nozzles coupled to a source of coolant fluid and positioned to dispense the coolant fluid on the metal article; and one or more heating nozzles.

Example 12 is the heating apparatus of example 11, further comprising: a temperature sensor positioned to measure a temperature of the metal article; and a controller coupled to the temperature sensor and the one or more cooling nozzles to control an amount of coolant fluid dispensed by the one or more cooling nozzles.

Example 13 is the heating apparatus of example 11, further comprising: a temperature sensor positioned to measure a temperature of the metal article; and a controller coupled to the temperature sensor and the one or more heating nozzles to control an amount of heat applied by the one or more cooling nozzles.

Example 14 is the heating apparatus of examples 1-13, wherein the array of magnetic rotors rotate about an axis of rotation that is parallel a lateral width of the metal article and perpendicular a downstream direction.

Example 15 is the heating apparatus of examples 1-14, further comprising a chamber, wherein the metal article is positioned within the chamber in at least one of the flotation zone or the heating zone, and wherein the array of magnetic rotors is positioned opposite a wall of the chamber from the metal article.

Example 16 is the heating apparatus of example 15, wherein the chamber includes a top wall separable from a bottom wall to facilitate threading of the metal article into the at least one of the heating zone and the flotation zone.

Example 17 is the heating apparatus of examples 15 or 16, wherein the chamber is made of an electrically non-conductive, thermally insulating material.

Example 18 is the heating apparatus of examples 15-17, wherein the chamber comprises one or more ports connecting the chamber to a supply of inert gas.

Example 19 is a method, comprising: positioning a metal article in a heating zone of a heating apparatus; heating the metal article to a setpoint temperature in the heating zone; levitating the metal article in a flotation zone, wherein at least one of heating the metal article and levitating the metal article comprises rotating at least one magnetic rotor to generate changing magnetic fields adjacent the metal article; and maintaining the setpoint temperature for a duration while the metal article is being levitated in the flotation zone.

Example 20 is the method of example 19, wherein each of the at least one magnetic rotor comprises one or more permanent magnets rotatable about a common axis of rotation.

Example 21 is the method of examples 19 or 20, wherein the heating zone and the flotation zone overlap one another.

Example 22 is the method of examples 19-21, wherein both heating the metal article and levitating the metal article comprise rotating the at least one magnetic rotor.

Example 23 is the method of examples 19-22, further comprising directing the metal article from the heating zone to the flotation zone, wherein the flotation zone is located immediately after the heating zone in a downstream direction, wherein positioning the metal article in the heating zone comprises continuously accepting the metal article into the heating zone.

Example 24 is the method of examples 19-23, wherein heating the metal article comprises rotating one or more of the at least one magnetic rotor.

Example 25 is the method of example 24, wherein levitating the metal article comprises rotating an array of additional magnetic rotors.

Example 26 is the method of examples 19-25, wherein levitating the metal article comprises rotating the at least one magnetic rotor.

Example 27 is the method of example 26, wherein each of the at least one magnetic rotors comprises a plurality of laterally spaced-apart magnets rotatable about a common axis of rotation.

Example 28 is the method of examples 19-27, further comprising: measuring a temperature of the metal article using a temperature sensor; and controlling the heating device based on the measured temperature.

Example 29 is the method of examples 19-28, further comprising: providing coolant fluid to the metal article using one or more cooling nozzles.

Example 30 is the method of example 29, further comprising: measuring a temperature of the metal article using a temperature sensor; and controlling the dispensing of the coolant fluid based on the measured temperature.

Example 31 is the method of examples 19-30, further comprising: heating the metal article using one or more heating nozzles.

Example 32 is the method of example 31, further comprising: measuring a temperature of the metal article using a temperature sensor; and controlling the heating of the metal article based on the measured temperature.

Example 33 is the method of examples 19-32, wherein each of the at least one magnetic rotors rotates about an axis of rotation that is parallel a lateral width of the metal article and perpendicular a downstream direction of the metal article.

Example 34 is the method of examples 19-33, wherein levitating the metal article comprises levitating the metal article within a chamber and generating the changing magnetic fields through the chamber. In some cases, generating changing magnetic fields through the chamber includes generating changing magnetic fields from the at least one magnetic rotor positioned opposite a wall of the chamber from the metal article.

Example 35 is the method of example 34, further comprising threading the metal article into the chamber, wherein threading the metal article comprises: separating a top wall and a bottom wall of the chamber; inserting the metal article between the top wall and the bottom wall; and re-setting the top wall and the bottom wall together.

Example 36 is the method of examples 34 or 35, wherein levitating the metal article comprises generating the changing magnetic fields through non-conductive, thermally insulating material of the chamber.

Example 37 is the method of examples 34-36, further comprising supplying inert gas to the chamber.

Example 38 is the method of examples 34-37, wherein the chamber is an insulated chamber.

Example 39 is the method of examples 34-38, wherein the chamber is a gas-filled chamber.

What is claimed is:

1. A method, comprising:
    positioning a metal article in a heating zone of a heating apparatus;
    heating the metal article to a setpoint temperature in the heating zone;
    levitating the metal article in a flotation zone, wherein at least one of heating the metal article and levitating the metal article comprises rotating at least one magnetic rotor to generate changing magnetic fields adjacent the metal article, wherein each magnetic rotor comprises an axis of rotation, wherein each axis of rotation is parallel to a direction of travel of the metal article, and wherein each axis of rotation does not intersect the metal article; and
    maintaining the setpoint temperature for a duration while the metal article is being levitated in the flotation zone, wherein levitating the metal article comprises levitating the metal article within a chamber extending in at least one of the flotation zone and the heating zone and generating the changing magnetic fields through the chamber, wherein the chamber comprises a top wall and a bottom wall, and wherein the top wall is movable relative to the bottom wall such that a distance between the top wall and the bottom wall is adjustable, wherein the method further comprises threading the metal article into the chamber, and wherein threading the metal article into the chamber comprises: separating the top wall and the bottom wall of the chamber by increasing the distance between the top wall and the bottom wall; inserting the metal article between the top wall and the bottom wall; and re-setting the top wall and the bottom wall by decreasing the distance between the top wall and the bottom wall.

2. The method of claim 1, wherein each of the at least one magnetic rotor comprises one or more permanent magnets rotatable about a common axis of rotation.

3. The method of claim 1, wherein the heating zone and the flotation zone overlap one another.

4. The method of claim 1, wherein both heating the metal article and levitating the metal article comprise rotating the at least one magnetic rotor.

5. The method of claim 1, further comprising directing the metal article from the heating zone to the flotation zone, wherein the flotation zone is located immediately after the heating zone in a downstream direction, wherein positioning the metal article in the heating zone comprises continuously accepting the metal article into the heating zone.

6. The method of claim 1, wherein each of the at least one magnetic rotors comprises a plurality of laterally spaced-apart magnets rotatable about a common axis of rotation.

7. The method of claim 1, further comprising:
    providing coolant fluid to the metal article using one or more cooling nozzles.

8. The method of claim 1, further comprising:
    providing heat to the metal article using one or more heating nozzles;
    measuring a temperature of the metal article using a temperature sensor; and
    controlling the heat provided to the metal article by the one or more heating nozzles based on the measured temperature.

9. The method of claim 1, wherein each of the at least one magnetic rotors rotates about an axis of rotation that is parallel to a lateral width of the metal article and perpendicular to a downstream direction of the metal article.

10. The method of claim 1, further comprising supplying inert gas to the chamber.

11. A heating apparatus, comprising:
    a heating zone for accepting a metal article, wherein the heating zone comprises at least one heating device for increasing a temperature of the metal article;
    a flotation zone coupled to the heating zone for maintaining the temperature of the metal article, wherein the flotation zone comprises an array of flotation devices for levitating the metal article, wherein at least one of the at least one heating device and the array of flotation devices comprises an array of magnetic rotors positioned adjacent the metal article, wherein each magnetic rotor comprises an axis of rotation, and wherein each axis of rotation is parallel to a direction of travel of the metal article, and wherein each axis of rotation does not intersect the metal article; and
    a chamber extending in at least one of the flotation zone and the heating zone, wherein the metal article is positioned within the chamber in the at least one of the flotation zone and the heating zone, wherein the chamber includes a top wall and a bottom wall, wherein the metal article is receivable between the top wall and the bottom wall within the chamber, and wherein the top wall is movable relative to the bottom wall such that a distance between the top wall and the bottom wall is adjustable to facilitate threading of the metal article into the at least one of the flotation zone and the heating zone.

12. The heating apparatus of claim 11, wherein each magnetic rotor of the array of magnetic rotors comprises at least one permanent magnet.

13. The heating apparatus of claim 11, wherein the heating zone and the flotation zone overlap one another.

14. The heating apparatus of claim 13, wherein both of the at least one heating device and the array of flotation devices comprise the array of magnetic rotors.

15. The heating apparatus of claim 11, wherein the flotation zone is located immediately after the heating zone in a downstream direction, wherein the heating zone includes an entrance for continuously accepting the metal article, and wherein the flotation zone includes an exit for continuously outputting the metal article.

16. The heating apparatus of claim 11, wherein the at least one heating device comprises the array of magnetic rotors.

17. The heating apparatus of claim 11, wherein the array of flotation devices comprises the array of magnetic rotors.

18. The heating apparatus of claim 17, wherein the array of magnetic rotors comprises a plurality of rotors each comprising a plurality of laterally spaced-apart magnets.

19. The heating apparatus of claim 11, further comprising at least one of:
   (1) one or more cooling nozzles coupled to a source of coolant fluid and positioned to dispense the coolant fluid on the metal article; and
   (2) one or more heating nozzles for heating the metal article.

20. The heating apparatus of claim 11, wherein each axis of rotation is perpendicular to a downstream direction.

21. The heating apparatus of claim 11, wherein the chamber comprises one or more ports connecting the chamber to a supply of inert gas.

* * * * *